United States Patent
Kampe et al.

(10) Patent No.: US 7,500,249 B2
(45) Date of Patent: Mar. 3, 2009

(54) CLUSTER EVENT SERVICE METHOD AND SYSTEM

(75) Inventors: Mark A. Kampe, Los Angeles, CA (US); Frederic Herrmann, Palo Alto, CA (US); Ludovic Christophe Fernandez, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1766 days.

(21) Appl. No.: 09/846,254

(22) Filed: May 2, 2001

(65) Prior Publication Data

US 2002/0016867 A1 Feb. 7, 2002

Related U.S. Application Data

(60) Provisional application No. 60/201,148, filed on May 2, 2000, provisional application No. 60/201,099, filed on May 2, 2000.

(51) Int. Cl.
*G06F 13/00* (2006.01)
(52) U.S. Cl. .................................................. 719/318
(58) Field of Classification Search ................ 719/318

See application file for complete search history.

(56) References Cited

U.S. PATENT DOCUMENTS

| | | | |
|---|---|---|---|
| 5,557,798 A | 9/1996 | Skeen et al. | |
| 5,740,348 A | 4/1998 | Cunliffe et al. | 395/182.04 |
| 6,145,094 A | 11/2000 | Shirriff et al. | 714/11 |
| 6,163,856 A | 12/2000 | Dion et al. | 714/4 |
| 6,182,119 B1 | 1/2001 | Chu | |
| 6,314,533 B1 * | 11/2001 | Novik et al. | 714/39 |
| 6,363,435 B1 * | 3/2002 | Fernando et al. | 719/318 |
| 6,366,926 B1 * | 4/2002 | Pohlmann et al. | 719/318 |
| 6,438,618 B1 * | 8/2002 | Lortz et al. | 719/318 |
| 6,477,585 B1 * | 11/2002 | Cohen et al. | 719/318 |
| 6,584,491 B1 * | 6/2003 | Niemi et al. | 719/318 |
| 6,647,432 B1 * | 11/2003 | Ahmed et al. | 719/318 |
| 6,658,487 B1 * | 12/2003 | Smith | 719/318 |
| 6,748,455 B1 * | 6/2004 | Hinson et al. | 719/318 |
| 6,829,770 B1 * | 12/2004 | Hinson et al. | 719/318 |
| 2005/0044554 A1 * | 2/2005 | Hinson et al. | 719/318 |

* cited by examiner

*Primary Examiner*—Andy Ho
(74) *Attorney, Agent, or Firm*—Kent A. Lembke; Marsh Fischmann & Breyfogle LLP

(57) ABSTRACT

A network having a plurality of nodes is disclosed. The network includes an event channel adapted to transmit an event between a publisher node and a subscriber node within the network. The network also includes a filter to identify the event on the subscriber node. The network also includes an application on the subscriber node to receive the event according to the filter.

33 Claims, 13 Drawing Sheets

CLUSTER EVENT SERVICE METHOD AND SYSTEM

CROSS-REFERENCE TO RELATED APPLICATIONS

This application claims the benefit of U.S. Provisional Patent Application No. 60/201,148 filed May 2, 2000, and entitled "CLUSTER EVENT SERVICE," and U.S. Provisional Patent Application No. 60/201,099 filed May 2, 2000, and entitled "CARRIER GRADE HIGH AVAILABILITY PLATFORM," which are hereby incorporated by reference.

BACKGROUND OF THE INVENTION

1. Field of the Invention

The present invention relates to networks having nodes that exchange data. More particularly, the present invention relates to networks having a message capability to send and receive messages on shared communication paths.

2. Discussion of the Related Art

Communication networks are used to transfer, exchange, send and receive information. Cluster networks may be those networks having a number of nodes that perform the above functions. Nodes within the network may receive information and use it, or pass it onto another node. Known networks may exchange the information in an asynchronous manner. An asynchronous messaging application program interface may provide a sequenced and reliable node-to-node connection stream. As networks increase in complexity and size, sequenced and reliable messaging between nodes is desirable.

SUMMARY OF THE INVENTION

An embodiment includes a network having a plurality of nodes. The network includes an event channel to transmit an event between a publisher node and a subscriber node within the network. The network also includes a filter to identify the event on the subscriber node. The network also includes an application on the subscriber node to receive the event according to the filter.

According to another embodiment, a node within a network to exchange information is disclosed. The node includes an application. The node includes an event server to receive an event from an event channel. The node includes a filter to identify the event for the application.

According to another embodiment, a method for receiving information at a node is disclosed. The method includes opening an event channel at the node. The method also includes assigning a filter to the event channel. The method also includes receiving an event on the event channel according to the filter.

According to another embodiment, a method for receiving information at a node is disclosed. The method includes receiving an event from an event channel at the node. The method includes filtering the event from the event channel with a filter corresponding to a application at the node.

BRIEF DESCRIPTION OF THE DRAWINGS

The accompanying drawings, which are included to provide a further understanding of the disclosed embodiments and are incorporated in and constitute a part of this specification, illustrate the disclosed embodiments. In the drawings.

DETAILED DESCRIPTION OF THE PREFERRED EMBODIMENTS

Figure 1:
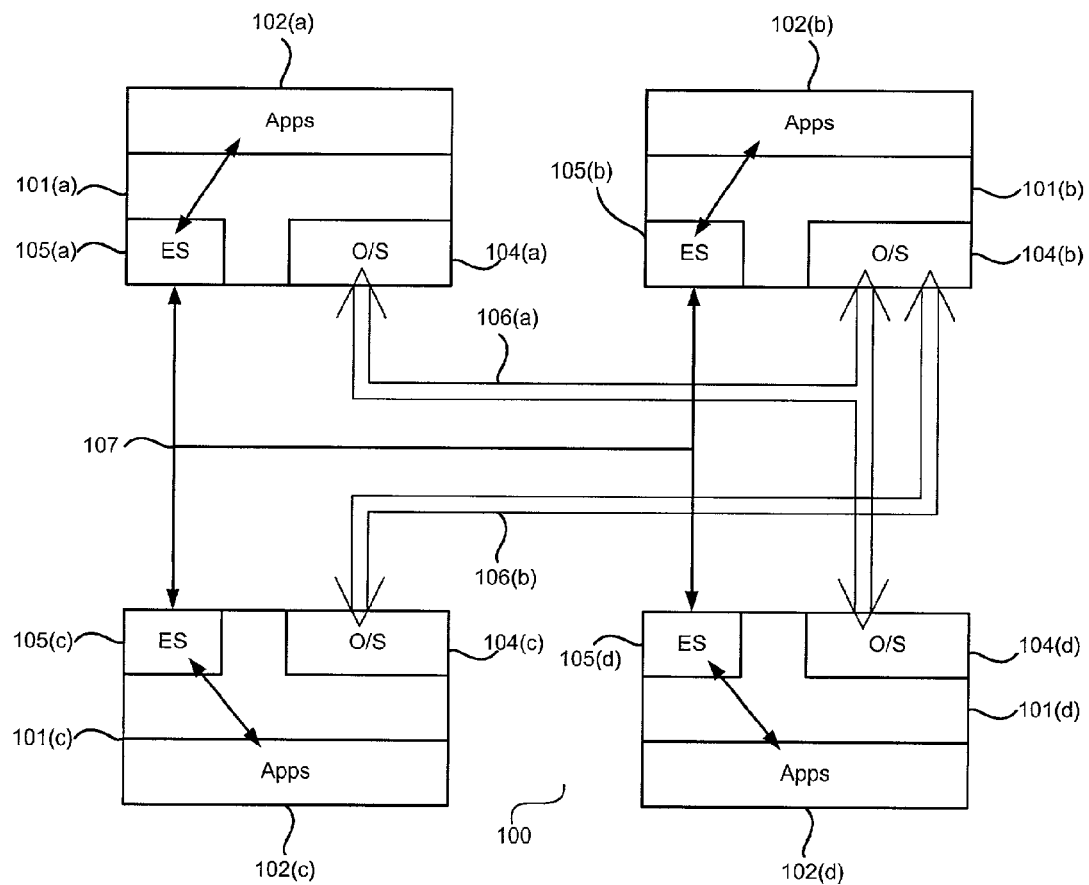
FIG. 1 illustrates a network for exchanging information in accordance with an embodiment of the present invention.

Reference will now be made in detail to the preferred embodiments, examples of which are illustrated in the drawings. According to the preferred embodiments, a network provides a messaging mechanism to deliver information between nodes within the network. The network may be known as a cluster. The cluster network generates and sends a message on a shared communication path without designating a specific recipient or destination end-point at the time of message generation. One or more processes, such as a client application on a node, may register their interest in receiving the message and the message will be delivered to all the interested parties.

FIG. 1 depicts a network 100 for exchanging information in accordance with an embodiment of the present invention. Network 100 may be known as a cluster service network, as discussed above. Network 100 includes nodes 101(*a*), 101(*b*), 101(*c*) and 101(*d*). Nodes 101(*a*), 101(*b*), 101(*c*) and 101(*d*) may have similar configurations and are platforms for the same applications. Alternatively, nodes 101(*a*), 101(*b*), 101 (*c*) and 101(*d*) may have different configurations and are platforms for different applications. For simplicity, however, nodes 101(*a*), 101(*b*), 101(*c*) and 101(*d*) will be disclosed as having the same basic configuration.

Node 101(*a*) includes operating system 104(*a*) that supports application 102(*a*). Node 101(*a*) also includes event server 105(*a*). Node 101(*b*) includes operating system 104(*b*) that supports application 102(*b*). Node 101(*b*) also includes event server 105(*b*). Node 101(*c*) includes operating system 104(*c*) that supports application 102(*c*). Node 101(*c*) also includes event server 105(*c*). Node 101(*d*) includes operating system 104(d) that supports application 102(d). Event servers 105(a)-(d) may be linked by communication link 107. Communication link 107 may be any communication medium capable of exchanging information, such as cable, fiber optics, cellular, lines, wireless platforms, and the like.

Operating systems 104(a)-(d) support applications 102(a)-(d) in a known manner. The operating systems provide interface support for the applications. The operating systems also interact with the event servers to access network 100.

Event servers 105(a)-(d) reside on their respective nodes and communicate with the applications on the node. The local event servers may communicate with each other through communication link 107. Event servers 105(a)-(d) receive and distribute events within network 100. Event servers 105(a)-(d) deliver events to the applications at that node.

Network 100 also includes event channels 106(a) and 106(b). Event channels are created and opened to distribute events throughout network 100. Network 100 architecture is based upon event channels. Event channels 106(a) and (b) provide the communication path to transport messages, or events, from publisher nodes to subscriber nodes. Event channels 106(a) and (b) provide interfaces to their client nodes. Event channels 106(a) and (b) may interface to publish, or transmit, an event. Event channels 106(a) and (b) also may interface to subscribe, or receive, a specific subset from all the events transmitted on the channels. Network 100 supports multiple event channels that may be used by different client applications 102(a)-(d) to publish and receive events. Network 100 ensure a reliable delivery of events with event channels 106(a) and (b) if they are published to network 100. The event is delivered to all subscribers that have registered interest in that particular type of event.

An event channel may be seen as a communication pipe that allows multiple suppliers to communicate with multiple consumers asynchronously. Event channels, such as event channels 106(a) and (b), may be global to a network and identified by a unique name. An event channel defines the qualities of service provided by the publisher/subscriber mechanism in terms of access restrictions, reliability, flow control, events ordering, delivery mechanism, events filtering and the like. Applications, such as application 102(a), that want to communicate using the publisher/subscriber framework may need to create an event channel.

For example, nodes 101(a), 101(b) and 101(d) may have registered interest in the events published on event channel 106(b). Node 101(d) publishes an event from application 102(d), and may be called the publisher node. Event server 105(d) places the event onto event channel 106(b). Event channel 106(b) transmits the event to all nodes coupled by event channel 106(b). Node 101(a) has identified through event server 105(a) that it would like to receive the particular type of event for application 102(a), and may be called a subscriber node. Thus, the published event is received and stored by event server 105(a) on node 101(a).

Node 101(b), however, has not identified through event server 105(b) that it would like to receive the particular type of event. Therefore, the published event may be received by event server 105(b), but not acted upon or saved. An event also may be dropped by network 100 if a subscriber does not consume events quickly enough and the internal buffers of the node or network overflow. Other conditions that may result in dropped events include the subscriber application failing, network 100 failing, or the underlying communication mechanism and system software fails. In the case of lost events, the subscriber is notified so it may undertake appropriate actions.

Figure 2:
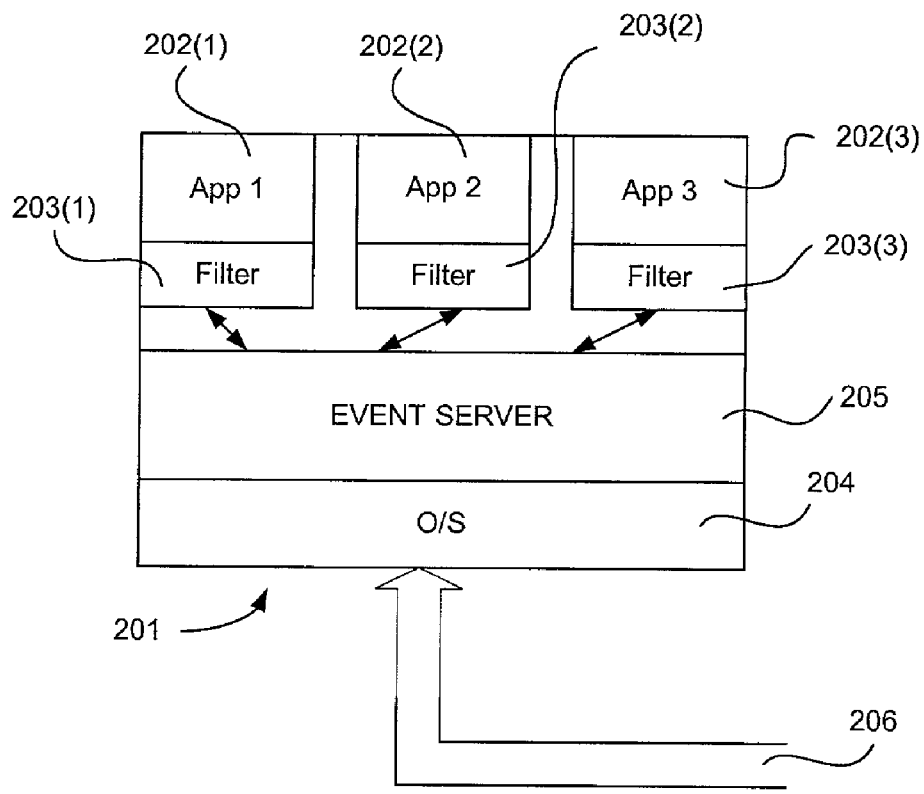
FIG. 2 illustrates a node within a network, for receiving and publishing events in accordance with an embodiment of the present invention.

FIG. 2 depicts a node 201 within a network for receiving and publishing events on an event channel 206 in accordance with an embodiment of the present invention. Node 201 may correspond with nodes 101(a)-(d) depicted in FIG. 1. Node 201 may be within a cluster event service network that publishes and receives events over event channel 106. Node 201 may be any platform with hardware and software components, such as a server, computer, laptop, hand-held device and the like. Node 201 may include operating system 204 that supports and interfaces with client applications running on node 201. For example, applications 202(1), 202(2) and 202(3) may be running on node 201 after being launched by operating system 204. Applications 202(1)-(3) are software applications that receive and transmit information. The information may be data packets, and the like.

Applications 202(1)-(3) may exchange information over event channel 206. Each application has a filter to identify those events that the application is interested in receiving through event server 205. Filter 203(1) identifies events in event channel 206 for application 202(1). Filter 203(2) identifies events in event channel 206 for application 202(2). Filter 203(3) identifies events in event channel 206 for application 202(3). Node 201 may have additional applications with filters and is not limited to three applications.

Event server 205 runs on node 201 and communicates with applications 202(1)-(3). Event server 205 also communicates with other event servers in remote locations, such as other nodes. Event servers communicate with one another so events are distributed to all the nodes that may have a subscriber application identifying those particular events. Event server 205 delivers events to all the subscribed applications on node 201. For example, an event is delivered on event channel 206 to event server 205. Event server 205 passes the event to application 202(1) if the event matches filter 203(1). Thus, if the event matches the filter for the local subscriber, then the event will be passed on to that subscriber.

Event server 205 also performs filtering when an event is published to event channel 206 by one of the applications on node 201. Event server 205 may forward the event to event servers on other nodes. The event servers may have subscribers on those nodes for that event. The event servers, including event server 205, may communicate through a control protocol in order to distribute the filtering information to the event servers.

A subscriber application to event channel 206 registers a filter with the cluster event service network to identify the subset of event that it wishes to receive. The subset of events is from all the events published on event channel 206 that is subscribed to. For example, application 202(1) registers filter 203(1) to receive events over event channel 206. The filtering mechanism of filter 203(1), and the other filters, may be based on pattern matching on the events published on event channel 206.

Applications may access the cluster event service network through an event service library that is linked with the application. The library implements a defined event application program interface ("API"). The library communicates with a local event server, such as event server 205, running on the same node as the client application. The cluster event service network provides the events functionality to applications running on the node though the event server. The client application, such as application 202(1), regards all the services by the cluster event service network as being accessed through the events library that links to the application and accessed by the event API.

The network including node 201, such as cluster event service network 100 of FIG. 1, should maintain a global view of the subscribers/publishers configuration within the network. More precisely, when an application publishes an event, the network should know which node has potential subscribers in order to route the event correctly. Several aspects may be involved in keeping track of all created event channels in the network, and for each opened event channel, and which node has publishers and potential subscribers. First, the current configuration of the event channels, such as event channel 206, created in the network should be known. Second, the list of nodes potentially interested on a given event channel should be known. Third, the filtering mechanism, such as filter 203(1), that modifies the subscriber's configuration for each published event should be known.

A global view of the network may be accomplished in two ways. First, the global view may be distributed among all event servers, such as event server 205. The event servers cooperate to guarantee the consistency of the configuration. Second, a global unique server may be used on the network to keep track of the configuration. The server will use the primary/secondary mechanism to persist in case of failure.

The one server approach may be appealing because developing a distributed algorithm in a fault tolerant environment may be complex. In addition, the subscribers/publishers configuration may be considered static in time regarding the number of events exchanged. Instead of developing a new specific server that involves duplicated work, the network may use the functionality of the naming service to keep the global view of the network. If there are static configuration changes in the future, however, the naming service may be distributed throughout the network.

Each event channel, such as event channel 206, has a corresponding naming context, or directory, in the naming service. A node interested in a given event channel may bind a named object to the corresponding event channel naming context. The named object contains enough information to localize an event control block within event server 205.

Figure 3:
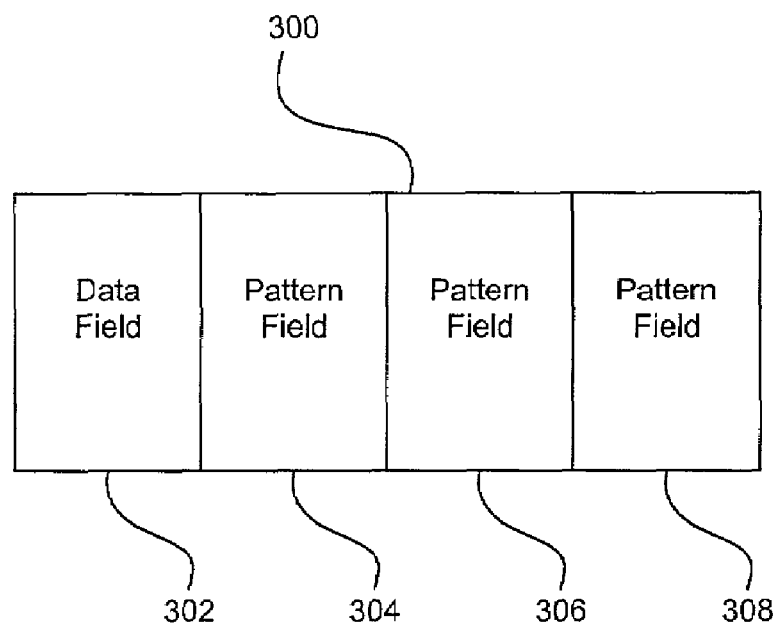
FIG. 3 illustrates an event for exchanging information over an event channel model in accordance with an embodiment of the present invention.

FIG. 3 depicts an event 300 for exchanging information over an event channel in accordance with an embodiment of the present invention. Event 300 may be allocated to an event channel as disclosed above. Event 300 is published and distributed to event servers over the event channel. Event 300 contains data to be used by a client application. Event 300 may include a data field 302 and three separate pattern fields 304, 306 and 308. Data field 302 may publish application specific information. The pattern fields 304, 306 and 308 may be used to distinguish different types of events. The publisher of event 300 may place any relevant pattern in pattern fields 304, 306 and 308. For example, pattern 304 may be the name of event 300, pattern 306 may be the type of event 300, and pattern 308 may be the name of the publisher.

A subscriber node selectively may register to receive only those events that match a predefined pattern. Using the predefined pattern, pattern fields 304, 306 and 308 are matched and identified as being a desired event if the patterns match. If a client application wants to receive some or all events published on the event channel, it may assign a filter that has the predefined pattern to identify event 300. Preferably, the filter is composed of three patterns that will be matched against the three patterns of every event published on the event channel. Those events that match the filter patterns may be delivered to the client application that subscribed to the event.

Although the above embodiment disclosed three patterns within event 300, any number of patterns may comprise event 300. In addition, the patterns may include any type of data pertaining to event 300, and are not limited to the example given above.

Figure 4:
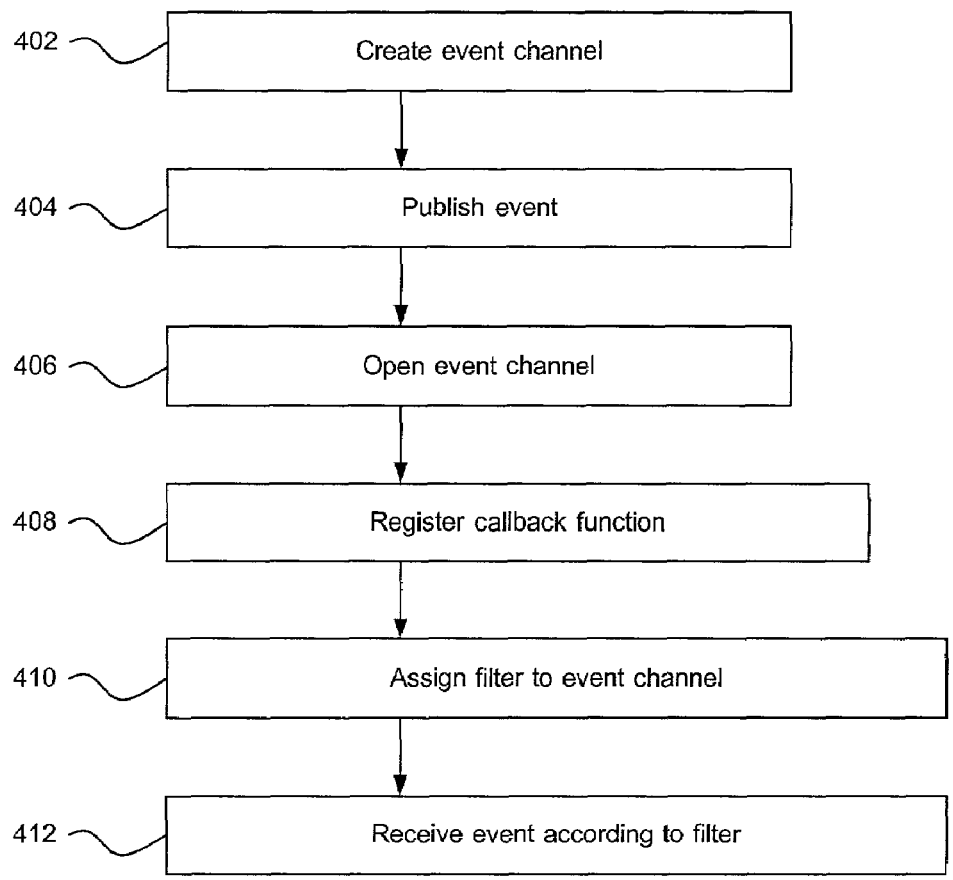
FIG. 4 illustrates a flowchart for receiving information within a network in accordance with an embodiment of the present invention.

FIG. 4 depicts a flowchart for receiving information within a network in accordance with an embodiment of the present invention. The information is received by a node within the network. Step 402 executes by creating an event channel. An application at the publisher node opens the event channel for reading and writing after creating it. Step 404 executes by publishing the event, such as event 300 in FIG. 3, on the event channel. The events may be published as needed by the application. Step 406 executes by opening the event channel at a subscriber node. The subscriber node may open the event channel for reading and writing, and at a later time than the publisher node created the event channel. Step 408 executes by registering a callback function from the subscriber node. Preferably, the callback function is registered in an event server at the subscriber node and coupled to the event channel.

Step 410 executes by assigning a filter to the event channel to identify those events of interest to the subscriber node applications. As the publisher node publishes events, the events that match the subscriber node's filter are delivered to the subscriber node. Step 412 executes by receiving the event at the node through the event channel. The event is received according to the filter. Reception of the events may include dispatching the callback function to control the flow of events on the event channel.

Further, the subscriber node disclosed above may publish events on the same event channel by following the same steps. Another subscriber node may open the event channel for reading events, and may assign a filter to identify events. In short, all nodes may publish and receive events on the event channel.

Figure 5:
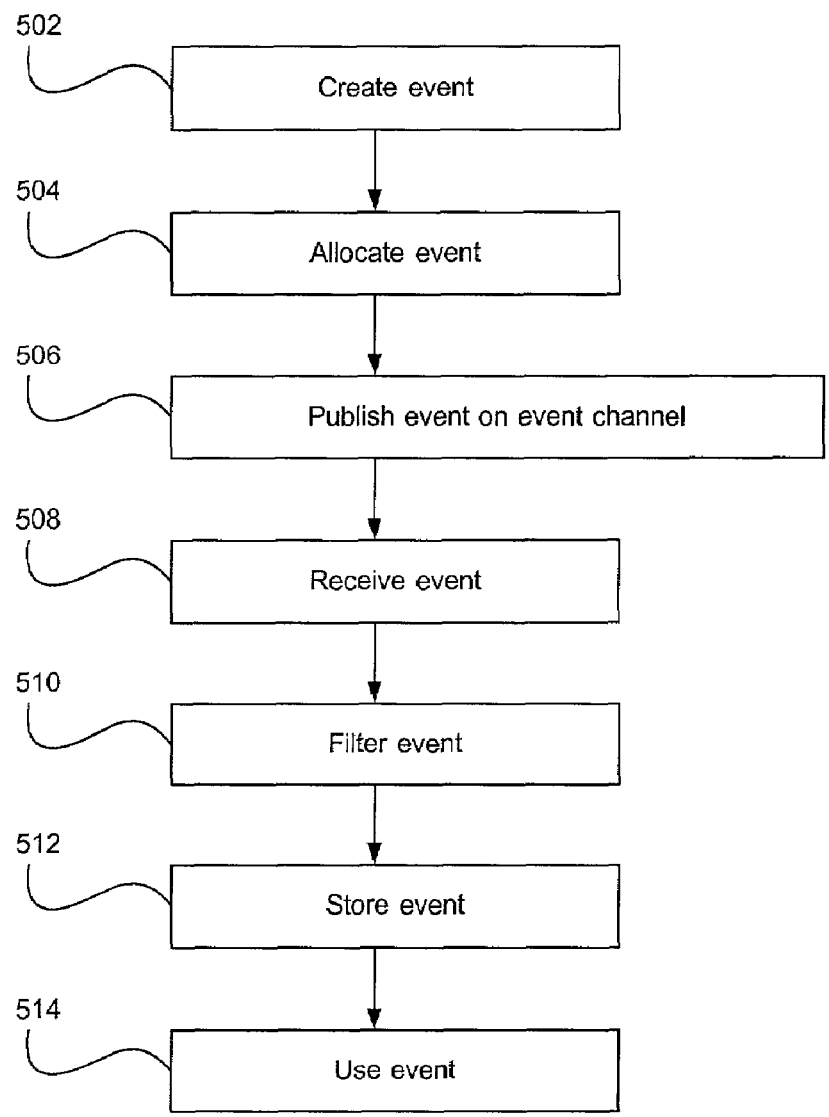
FIG. 5 illustrates a flowchart for exchanging events within a network in accordance with an embodiment of the present invention.

FIG. 5 depicts a flowchart for exchanging events within a network in accordance with an embodiment of the present invention. Events may carry information within the network to nodes without having to specify destination information. Step 502 executes by creating an event at a publisher node within the network. An application at a node may create the event and open an event channel to send the event to other nodes within the network. Step 504 executes by allocating the event to the event channel. The allocation may be done with an event server residing on the publisher node. Step 506 executes by publishing the event on the event channel to make the event available to the network.

Step 508 executes by receiving the event at a subscriber node. There may be more than one subscriber node. Step 510 executes by filtering the event at the subscriber node. A filter may be assigned to identify the event as being of interest to an application on the subscriber node. The filter may have filter pattern fields that match the pattern fields of the event. Step 512 executes by storing the event at the subscriber node until needed by the application. Step 514 executes by using the event in the application that assigned the filter to identify the event.

Figure 6:
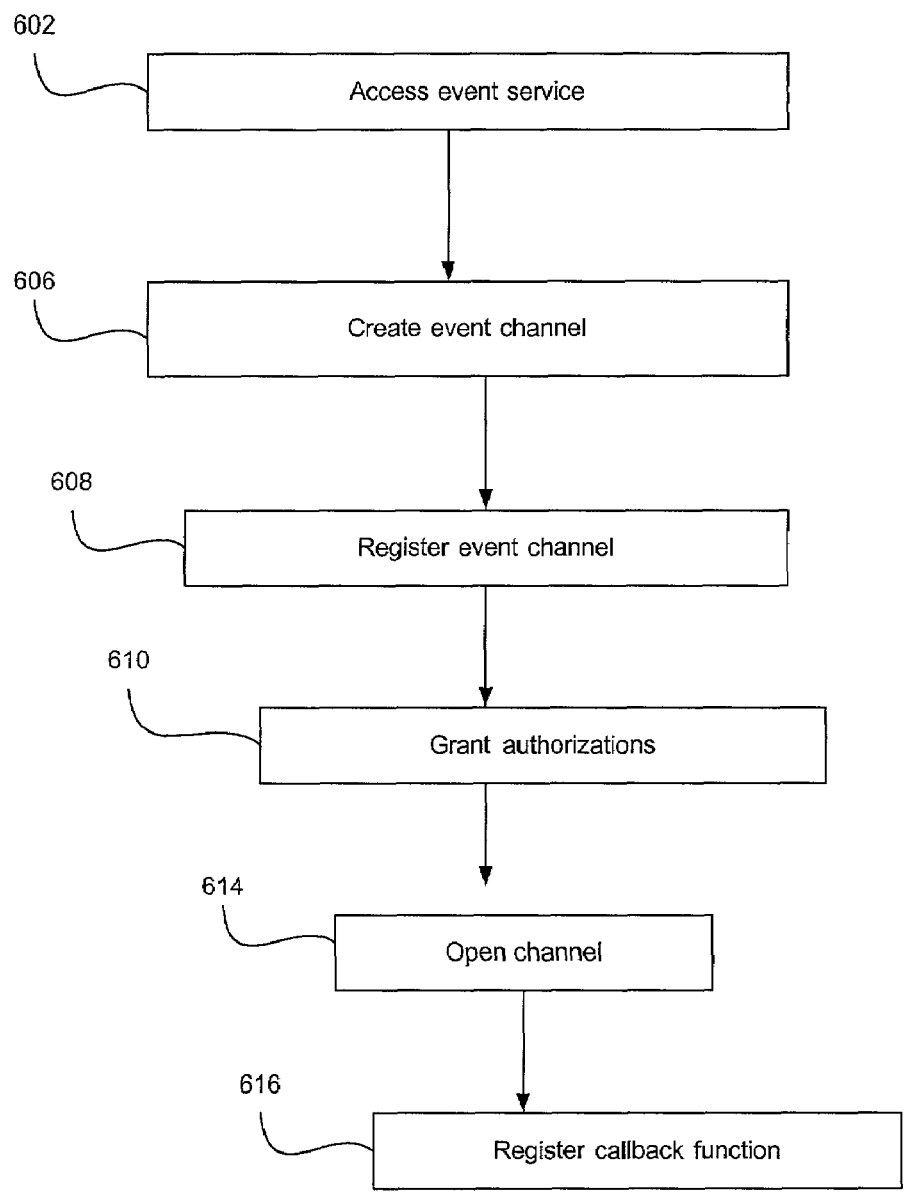
FIG. 6 illustrates a flowchart for creating an event channel within a network in accordance with an embodiment of the present invention.

FIG. 6 depicts a flowchart for creating an event channel within a network in accordance with an embodiment of the present invention. An event channel may be created to publish and subscribe to events within the network. Applications on nodes may create and open event channels, as well as subscribe to existing event channels. Step 602 executes by accessing the event server through a library with an application on a node within the network.

Step 606 executes by creating the event channel in the local event server. The event channel may be created by an application at a node. The event channel is created with a desired global name by invoking the appropriate function of the event API. Step 608 executes by registering the event channel and its global name with the naming service. The event library also may allocate resources to the event channel. Step 610 executes by granting authorizations to the event channel to applications within the network. During event channel creation, as disclosed above, appropriate access permissions may be associated with the event channel in the naming service. The permissions may be used by the network to selectively provide service on the event channel to application processes with credentials that allow the appropriate access rights. More specifically, write permissions may be needed to allow an application process to publish an event on the event channel. Read permissions may be needed to allow an application process to receive events on the event channel.

Once the event channel is created, other applications may open the event channel for either reading or writing, or both. The act of creating an event channel also implicitly opens the event channel. Step 614 executes by opening the event channel. Step 616 executes by registering a callback function. When an application opens the event channel, the application also registers the callback function to be invoked when an appropriate event is delivered to the subscribing application. Once the event channel is opened, the application can allocate an event using the event API function and may publish the event on the event channel.

Figure 7:
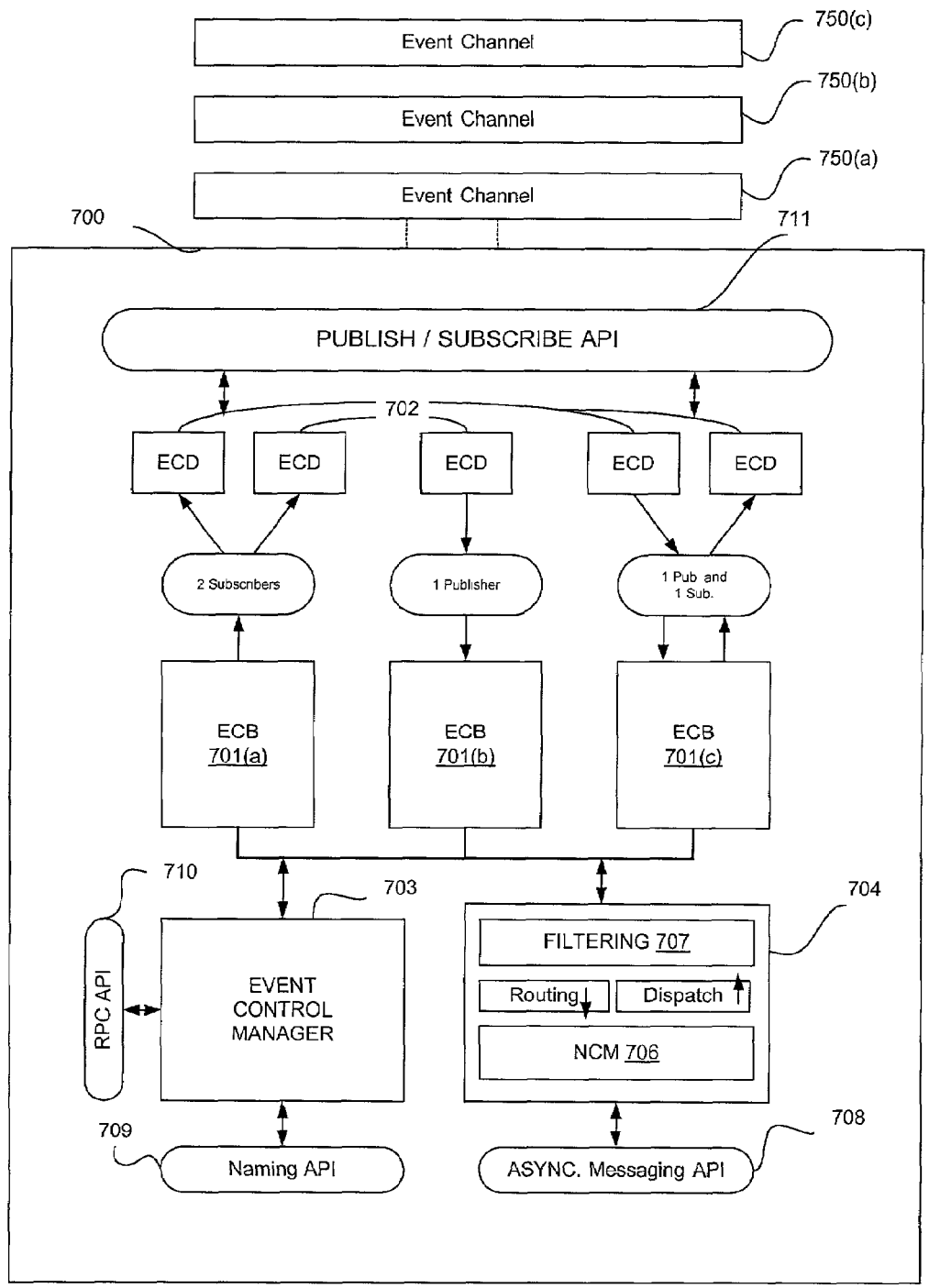
FIG. 7 illustrates an event server on a node in accordance with an embodiment of the present invention.

FIG. 7 depicts an event server 700 on a node in accordance with an embodiment of the present invention. Event server 700 also may be called an event manager. As disclosed above, each node of a cluster event service network runs an application called an event server. Event server 700 is responsible for dispatching incoming events and routing published events over event channels 750(a)-(c). Event server 700 may be coupled to event channels 750(a)-(c), and to applications residing on the node. Event server 700 also may be coupled to other event servers within the network.

FIG. 7 depicts the components that may reside within event server 700. Event channel descriptors 702 may be allocated each time an application opens an event channel, such as event channels 750(a)-(c). Event channel descriptors 702 contain information to access event control blocks 701(a)-(c) on behalf of the user process, or client application. In particular, the role of the event channel descriptors 702 may be to keep track of the events received on event channels 750(a)-(c) but not yet processed by the application. In addition, event channel descriptors 702 may manage the file descriptor corresponding to the event channel. Further, event channel descriptors 702 may record all information relative to the application that opened event channel 750. In particular, the app-name field, deliver-event callback and filtering assignment structures may be kept in the individual event channel descriptors.

When an application terminates, whether or not by accident, all event channel descriptors allocated on behalf of the application are freed. Further, a limit may exist on the number of event channel descriptors that can be allocated for a specific event channel block. The limit may be adjustable, or, alternatively, a constant. A default limit value may exist.

Event control blocks 701(a), (b) and (c) may be passive objects that hold all information relative to an event channel within a network, or cluster. An event control block may be compared to an inpcb or tcpcb structure of a TCP/IP stack. One instance of an event control block per event channel may be opened locally on a node. The role of event control blocks 701(a)-(c) may be to keep track of all event channel descriptors 702 currently using event channels 750(a)-(c). In addition, event control blocks 701(a)-(c) may queue incoming events until all event channel descriptors 702 process the events. Further, event control blocks 701(a)-(c) may record a list of remote control block objects that specifies all nodes interested in event channel 750(a)-(c).

A remote event control block ("RECB") object acts as a local proxy for a distant event control block. RECB objects act as passive objects that contain the network connections on which events are received and published. RECB objects also may contain some filtering information that is used when an event is published to reduce the number of unnecessary messages sent. RECB objects also may contain various flags identifying the remote event control block as a publisher and/or a subscriber.

Event control manager 703 is the component responsible to control and guarantee the consistency of event server 700 through the network, or cluster. The role of event control manager 703 may be updating the RECB list of each event control block 701(a)-(c) when the subscribers/publishers configuration changes in the network for a given event channel. Event control manager 703 also may detect and fix overload conditions by keeping track of all events currently allocated in event server 700. Further, event control manager 703 may perform audit actions to check the consistency of event server 700. The implementation of event control manager 703 may rely on services provided by the naming service through naming service API 709.

Event protocol module 704 may implement the network protocol used by the network to process events. Event protocol module 704 manages all the network connections used by the event framework. Event protocol module 704 may be responsible to collect, filter and dispatch incoming events to the corresponding event control block 701(a)-(c). Event protocol module 704 also may send published events to a list of nodes that have potential subscribers. Further, event protocol module 704 may detect and handle modifications of the established subscribers/publishers configuration. Event protocol module 704 may rely on the service provided by an asynchronous messaging mechanism through asynchronous messaging API 708.

Event server 700 manages events on event channels 750(a)-(c). Referring back to FIG. 3, an event may include a data field and pattern fields. Events also are discussed in greater detail below. Three types of event structure may exist, depending on the execution context. A user event structure may be allocated and managed by the event library linked with the application. Though this structure may be exported as an opaque object, the user event structure may be the structure accessible by the application.

A system event structure may be allocated and managed by event server 700 to internally handle event that need to be published or events received from the network but not yet processed by the applications. A network event structure also may be managed by event server 700 to describe an event sent or received over the network.

All versions of events may have the following attributes in common. First, tree pattern strings may have a maximum size defined by the constant EVENT-PATTERN-MAX. Preferably, the maximum three pattern strings may be 1024 bytes. Second, a publisher name string may exist that has a maximum size defined by the constant EVENT-APPNAME-MAX. Preferably, this constant may be equal to 16 bytes. Other attributes include a time value structure, a unique identifier and a node unique identifier. Further, some data may be associated with an event. Preferably, the maximum size of the data buffer that may be attached with an event is defined by the constant EVENT-DATA-MAX. This constant may be equal to 1024 bytes.

A network event structure may be a contiguous chunk of memory prefixed by a header of a fixed size. Table 1 below depicts an example of a network event structure. Reference may be made to Appendix A for definitions of function calls.

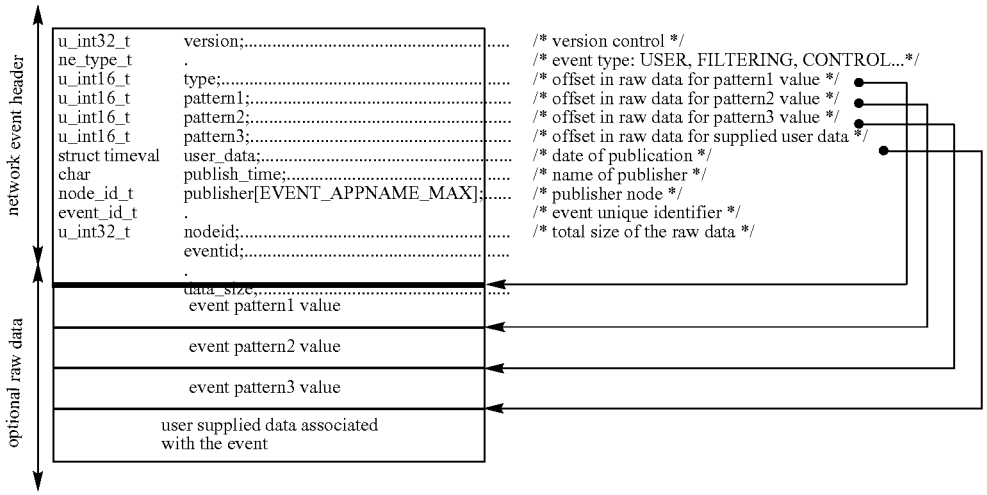

The version field identifies the format of the network event structure, and may be used to distinguish different versions of the event framework in the network, or cluster. The type field defines the class of the event. The possible values for this field may be given by the following C program example:

```
typedef enum {
    USER,           /* application event */
    FILTERING       /* filtering control event */
    ACK             /* internal acknowledge event */
} ne_type_t;
```

The data size field shows the total size in bytes of the optional raw data associated with a network event. All other fields may be common attributes of an event structure.

A system event structure may defined as a C++ class and may be a superset of a network event structure, as disclosed above, and may be shown by the following C program example:

```
class SysEvent {
tBitString      ecd_deliver;   /* event channel descriptors bit string */
link_t          ecb_link;      /* ECB link in the received event
                                  queue */
ne_header_t     net_header;    /* network event header */
void*           data;          /* optional raw data from the network
event*/
public;
        <methods to access the network and system event attributes>
};
```

The ecd_deliver field may be a bits string with a maximum length defined by the constant MAX-ECD, with a default value of 256 bits. Each bit may correspond to a potential event channel descriptor. This field may be used to identify which event channel descriptor should process the event. Ecb_link may be used to link the event in the received event queue of an event control block, such as event control block 701(a). The net_header and data fields correlate to the network event structure.

A user event structure may be described by the following example C program:

```
typedef {
    char*           pattern1;
    char*           pattern2;
    char*           pattern3;
    char            publisher [EVENT_APPNAME_MAX];
    struct timeval  publish_time;
    event_id_t      eventid;
    node_id_t       nodeid;
} ces_event_t;
```

The size of an event pattern, such as pattern field 306 in FIG. 3, may be relatively small, such as about 16 bytes. Thus, event patterns may be directly included in the event structures. Errors, however, may be issued if the memory allocation for the event pattern fails. Further, when an event is delivered to the application, events patterns may be allocated. The patterns may be allocated in the data buffer provided by the application, or, alternatively, the patterns may be allocated dynamically in the heap of the application during event dispatch.

Most of the objects used by event server 700 may be allocated using function calls, such as those disclosed within Appendix A. System event objects, however, may be managed differently, and may be allocated and freed using a dynamic pool. The pool is dynamic in that the heap is not pre-allocated when event server 700 starts and can grow or shrink when needed. Event control manager 703 may be responsible for the management of the system event pool. Event control manager 703 can control the use of the events inside the framework in order to detect overload conditions or perform statistic and audit actions.

As noted above, event server 700 controls the flow of events in the network, along with other event servers at different nodes. Two aspects may be seen regarding the flow control of the events in the network. At the publisher node, to assure the atomicity of an event, the sender node should guarantee that an event is sent to all subscriber nodes or not at all. This aspect may be achieved by setting correctly the low water mark of the socket describing the point-to-point connection. Using the correct value, the system call select only may return TRUE if there is enough space in the socket to send at least one event. In the case an event cannot be sent to all subscriber nodes, the function call event publish fails with an error code.

The subscriber side node is different than the publisher side node. To avoid a publication failure, the event framework should consume all events received from the network and queue the events until all applications process them. Because the notification mechanism is asynchronous and the application fetches events when needed and not when they arrive, there is potentially a large number of events waiting to be processed in event server 700. An overload situation occurs when this number becomes too important to be considered reasonable. Then such a situation is detected, event control manager 703 may be able to figure out which event channel descriptors 702 are responsible for the overload situation and close their corresponding event control block 701(a)-(c) connections. This closure action frees all the resources used by the faulty applications.

An overload condition should be distinguished from a temporary peak load. A temporary peak load may be a normal situation, not in need of remedial measures. A distinction may exist between the two conditions. An upper limit may exist on the number of resources event server 700 can use internally for system events. When this limit is reached, event control manager 703 switches to an overload situation mode. In particular, no new subscriber will be accepted for an event control block, such as event control block 701(a). The function call event_channel open fails with an error code if the permission access specifies subscribing and there is not already a subscriber for event control block 701(a). Event control manager 703 may check all event channel descriptors 702 to detect faulty applications and rectify the overload situation.

Each event control block 701(a)-(c) may record the theoretical upper limit of the number of events potentially queued. The upper limit value may be dynamically computed or adjusted based on certain criteria. The value may not be an instant value but a linear computation that should converge in time. One criteria may be the maximum throughput of the application to process events. The throughput value is based on the application response time to detect and process incoming events between the time event server 700 notifies the application of new incoming events and the actual processing of the events, and the number of events fetched between two notifications. Another criteria may be the rate of incoming events on the corresponding network connection or on event channel 750. When the actual number of events queued on a particular ECB becomes much bigger than its computed average upper limit, the ECB is considered faulty.

With regard to new event channels, as noted above, each event channel has a corresponding naming context in the naming service. A node interested in a given event channel may bind a named object to the corresponding event channel naming context. The named object localizes an event control block object in the network and to identify it as a publisher and/or subscriber. The name used for the naming context of event channels 750(a)-(c) may be directly related to the name provided by the application during an event channel open. The permissions used to create the naming context are taken directly from the oflag parameter of the event channel open. To avoid applications searching the directory, the execution permission bit of the naming context is cleared and the named objects are bound with a read-only root credential. Event protocol module 704 may be responsible to maintain the local view of the network configuration. Event protocol module 704 cooperates with other distant event control modules to update the local configuration of each event server.

As noted above, an event channel, such as event channels 750(a)-(c), may be seen as a communication pipe that allows multiple suppliers to communicate with multiple consumers asynchronously. Applications, however, that want to communicate should create the event channels 750(a)-(c). Event API 711 provides a mechanism to create atomically event channel 750. Applications then may open event channel 750 for publishing events and/or subscribing to events.

As noted above, applications should have opened or created event channels 750(a)-(c) in writing mode to publish events. The first step may be to allocate an event using the ces_event_allocate function call. This function call allocates and initializes, to a default value, all attributes of an event object. In particular, three attributes, such as pattern fields, may define the name of the event. Alternatively, any number of attributes may define the name of the event. A publisher node should specify at least one value for a pattern before trying to publish an event. The application then may be able to publish the event using the ces_publish function call. Some data may be specified with an event at publish time.

Applications should have opened or created event channel 750 in reading mode to subscribe to events. The first step may specify those events the application wants to receive by using the ces_bind_subscriber function call. This function call uses a ces_bind_param_t structure which defines three filter strings, or fields. The filtering may be performed by prefix matching the filter fields with the event patterns. A match occurs, and the application receives the event, when each filter field is a prefix of the corresponding event's pattern. For example, filter 1 matches pattern 1, filter 2 matches pattern 2, and filter 3 matches pattern 3. A NULL value may be specified for a filter field such that the prefix matching is true for this pattern.

The application should have the responsibility for processing incoming events. The function call ces_channel_fileno(3) may return a file descriptor that the application can use to detect incoming events, preferably using the poll(2) or select (2) system calls. When event are detected, the application may use the ces_dispatch(3) function call to process the events.

A subscriber application that is not able to consume incoming events fast enough may lose some of the events. In this instance, the following specific event may be generated and published locally by the network to tell the subscriber application. The specific event may include a first event pattern that contains the work "CES_EVENT." A second event pattern may contain the string "EVENTS LOST." A third event pattern may contain a number encoded as a string indicating how many event have been lost. An EVATTR_PUBLISH_ID attribute may contain the word "CES" and an EVATTR_PUBLISH_NODE may be set to indicate the local node id. An EVATTR_PUBLISH_DATE attribute may be set to indicate when the application started losing events. This event bypasses the filtering mechanism of the node and is delivered to the application. Preferably, the network event service does not provide any mechanism to tell the publisher that a subscriber has lost events.

A publish operation may fail with the error code EAGAIN. This error may correspond to a temporary situation due to a congestion problem at event server 700. Preferably, the event network may include that a subscriber may not prevent a publication to fail indefinitely.

Event API 711 may be multi-thread safe in that mutual exclusion among threads is guaranteed when executing a critical section of the application program interface. The application program interface may be deferred thread cancellation safe and all function calls may be cancellation points.

Further, the application program interface may not be asynchronous thread cancellation safe. Event API 711 calls may not be interrupted by signals. If a signal is caught while in a call, the call runs to completion. The call may not be aborted and does not return with an error message. Application program interface calls may not by signal handler safe, and should not be made from signal handlers.

After a process terminates, either by a call to exit(2) or otherwise, opened event channels are closed, and the corresponding event channel handles, or names, become invalid. Resources allocated on the application's behalf by the network are reclaimed. After a fork or exec system call, however, all event channels names, or handles, opened by the parent remain valid in the child.

An example of the subscriber/publisher process may be given below in the following pseudo-code.

```
publisher.c include <stdio.h>
include <errno.h>
#include <string.h>
#include <ces.h>
    int
main (int argc, char* argv[])
{
    ces_channel_t         chid;
    ces_event_t           ev;
    int                   res;
    ces_channel_param_t   chparam;
    /*
     * Open or create for publishing an event channel named " my
    channel" .
     */
    chparam.deliver_event = NULL;
    chparam.app_name      = " publisher ";
    chid = ces_channel_open (" my channel",
        O_WRONLY | O-CREAT,
        S_IRWXU, &chparam); if (chid = = -1) {
        perror (" ces_channel_open failed ");
        exit (1);
    }
    /*
     * Allocate and publish the event "my event ".
     */
    ev = ces_event_allocate ();
    if (ev = = NULL) {
      perror ("ces_event_allocate failed");
      exit (1);
    }
    res = ces_set_pattern1 (ev, "my name");;
    if (res = = -1) {
        perror ("setting attribute EVATTR_PATTERN1 failed");
        exit (1);
    }
    res = ces_set_pattern2 (ev, "my class");;
    if (res = = -1) {
        perror ("setting attribute EVATTR_PATTERN2 failed");
        exit (1);
    }
    res = ces_set_pattern3 (ev, "my event");
    if (res = = -1) {
        perror ("setting attribute EVATTR_PATTERN3 failed");
        exit (1);
    }
    res = ces_publish(chid, ev, NULL, 0);
    if (res = = -1) {
        perror ("ces_publish failed");
        exit (1);
    }
    /*
     * Free the event and close the event channel
     * before exiting.
     */
    ces_event_free(ev);
    res = ces_channel_close(chid);
```

-continued

```
    if (res = = -1) {
        perror ("ces_channel_close failed");
        exit (1);
    }
    exit (0);
}
{
subscriber.c include <stdio.h>
include <stdlib.h>
#include <errno.h>
#include <string.h>
#include <time.h>
#include <sys/types.h>
#include <poll.h>
#include <ces.h>
    static int
my_delivery(ces_event_t ev, void* cookie, void* data size_t len)
{
    char        publisher   [CES_APPNAME_MAX];
    char        name        [CES_PATTERN_MAX];
    char        class       [CES_PATTERN_MAX];
    char        app         [CES_PATTERN_MAX];
    struct timeval          tv;
    int         res;
    /*
     * Get internal attributes from the event and print them.
     */
    res = ces_get_pattern1 (ev, name);
    if (res = = -1) {
        perror ("getting attribute EVATTR_PATTERN1 failed");
        name [0] = '\0';
    }
    res = ces_get_pattern2 (ev, class);
    if (res = = 1) {
        perror ("getting attribute EVATTR_PATTERN2 failed");
        class [0] = '\0';
    }
    res = ces_get_pattern3 (ev, app);
    if (res = = -1) {
        perror ("getting attribute EVATTR_PATTERN3 failed");
        app [0] = '\0';
    }
    res = ces_get_publishId(ev, publisher);
    if (res = = -1) {
        perror ("getting attribute EVATTR_PUBLISH_ID failed");
        publisher [0] = '\0';
    }
    res = ces_get_publishDate (ev, &tv);
    if (res = = -1) {
        perror ("getting attribute EVATTR_PUBLISH_DATE failed");
        name [0] = '\0';
    }
    printf ("Event %s class %s app %s received from %s published at
        %s\n",
        name, class, app, publisher, ctime($tv.tv_sec));
    return 0;
}
    int
main(int argc, char* argv[])
}
    ces_channel_t         chid;
    ces_channel_param_t   chparam;
    ces_bind_param_t      bind_param;
    ces_bind_t            bid;
    void*                 data;
    ces_event_t           ev;
    struct pollfds        fds [1];
    /*
     * Open or create for subscribing an event channel named "my
    channel",
     * registering my_delivery function as the callback to process
    incoming
     * events.
     */
    chparam.deliver_event =my_delivery;
    chparam.app_name = "subscriber";
    chid = ces_channel_open ("my channel",
        O_RDONLY | O_CREAT, S_IRWXU, &chparam);
```

-continued

```
if (chid == NULL) {
    perror ("ces_channel_open failed");
    exit (1);
}
/*
 * Subscribe on this event channel for all events containing "my
class",
 * inpattern2.
 */
bind_param.filter1 = NULL;
bind_param.filter2 = "my class";
bind_param.filter3 = NULL;
bid = ces_bind_subscriber(chid, &bind_param, NULL);
if (bid == -1) {
    perror ("ces_bind_subscriber failed");
    exit (1);
}
/*
 * Allocate resources to process incoming events.
 */
ev = ces_event_allocate ( );
if (ev == NULL) {
    perror ("ces_event_allocate failed");
    exit (1);
}
data = malloc (CES_DATA_MAX);
if (data == NULL) {
    fprintf(stderr, "data buffer allocation failed\n");
    exit (1);
}
/*
 * Infinite loop to process incoming events.
 */
fds [0].fd     =    ces_channel_fileno(chid);
fds [0].events =    POLLIN;
while (1) {
    if (poll(fds, 1, -1) == -1) {
        perror("poll failed");
        exit (1);
    }
    res = ces_dispatch(chid, ev, data, CES_DATA_MAX);
    if (res == -1) {
        perror("ces_dispatch failed");
        exit (1);
    }
}
/*
 * NEVER REACHED
 */
exit (0);
{
```

Figure 8:
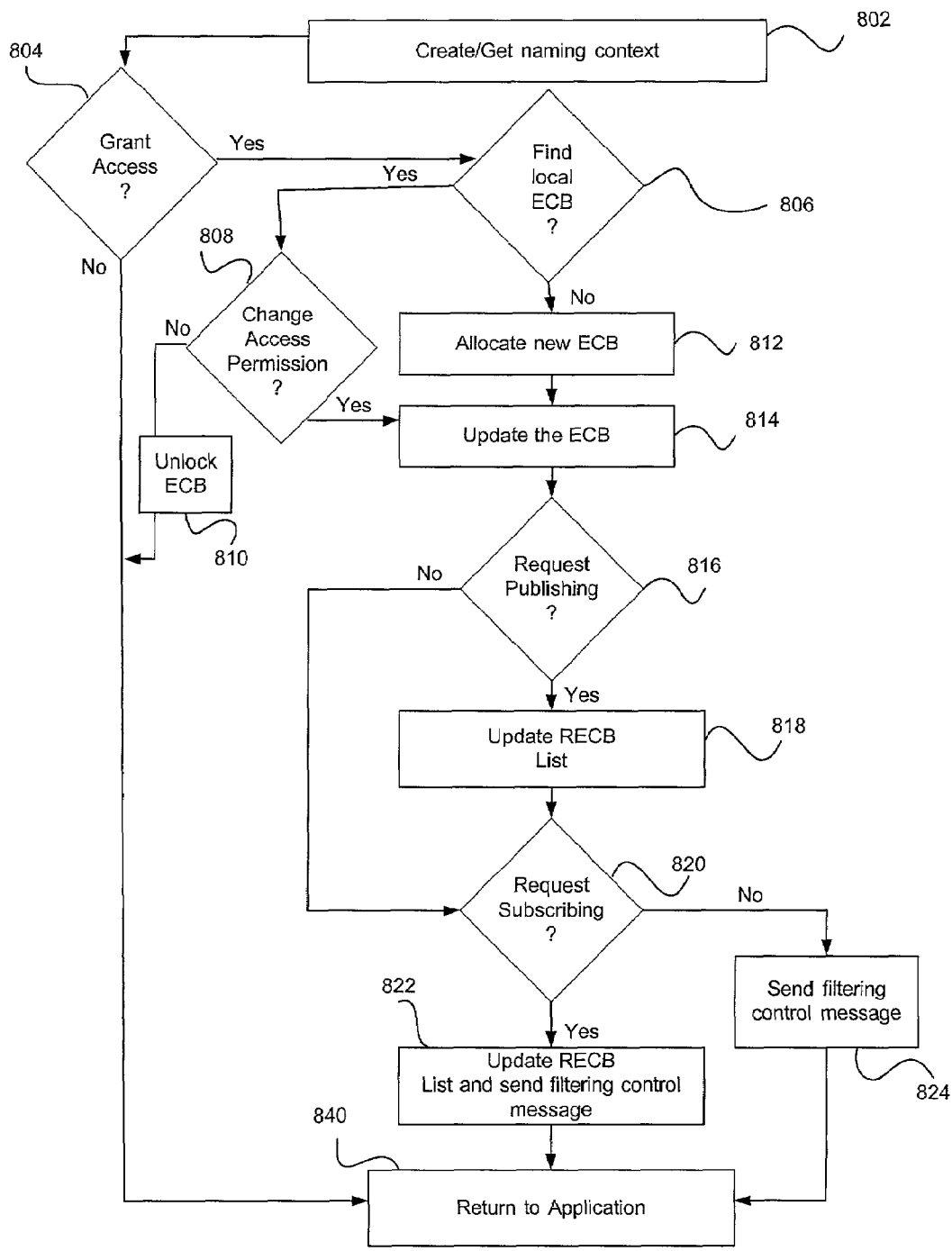
FIG. 8 illustrates a flowchart for declaring a new subscriber and/or a new publisher to an event, control block in accordance with an embodiment of the present invention.

FIG. 8 depicts a flowchart for declaring a new subscriber and/or a new publisher to an event control block in accordance with an embodiment of the present invention. The flowchart may be from an event control manager point of view, such as event control manager 703. A new subscriber and/or publisher may be declared during a function call to event_channel_open(3). The order between the different steps within the flowchart is preferred because the order may facilitate closing all the time windows to avoid race conditions and guaranteeing that the distributed view is consistent between all nodes of the network.

Step 802 executes by creating or getting a naming context corresponding to the event channel. As noted above, event channels may register unique names with the naming service. Step 804 executes by determining whether access has been granted. The event control manager may check for the correct access permissions regarding the event channel. If no, then step 840 is executed by returning to the application. If yes, then step 806 is executed by determining whether the local event control block for the event channel can be found. If yes, then step 808 executes by determining whether access permission is to be changed. If step 808 is yes, then step 814 is executed, as disclosed below. If step 808 is no, then step 810 executes by unlocking the event control block and returning to the application in step 840.

If step 806 is no, then step 812 is executed by allocating a new event control block to the event channel. Step 812 creates an asynchronous endpoint as part of the event control block object, using the socket(2) function call. The created socket is put into listen state and the event protocol module is requested to select read detecting incoming messages, using the select (2) function call. The new event control block is locked and put in the global table of the event server.

Step 814 executes by updating the event control block to reflect the new access permissions. A named object is built with the address of the event control block socket and the access permissions. Using the ns_rebind(3) function call, the named object is bound to the event channel naming context. The event control block is unlocked to be accessible by the applications and by the event control manager. The event control block may be updated in parallel. The naming context is browsed to collect all nodes interested in the event channel. The browsing may be done by using the ns_list(3) and ns_next(3) function calls.

Step 816 executes by determining whether the access permissions request publishing on the event channel. If no, then step 820 is executed, as disclosed below. If yes, then step 818 is executed by updating the remote event control block list. For each subscriber node within the network that is found in the naming context not found in the remote control event block list, a connect(2) function call is done to establish the connection with the distant event control block. Further, an RECB object is created with the new connections and is inserted into the remote event control event block list. The event protocol module is requested to perform the select(2) function call on the socket to start processing events on the connection.

Step 820 executes by determining whether the access permissions request subscribing on the event channel. If yes, then step 822 is executed by updating the remote event control block list. For each publisher node found in the naming context, the following actions may be taken. If the naming object is not found in the remote event control block list, a connect (2) function call is done to establish the connection with the distant event control block. Further, an RECB object is created with the new connections and is inserted into the remote event control event block list. The event protocol module is requested to perform the select(2) function call on the socket to start processing events on the connection. If the RECB object is found and marked as doing source filtering, then a filtering control message is sent to allow the RECB to publish all events on this connection and to clear the corresponding flag in the remote event control block. Step 840 executes by returning to the application.

If step 820 is no, then step 824 executes by sending a filtering control message to prevent the RECB from publishing events on this connection. This action may be done for each publisher and subscriber node found in the naming context. Further, the RECB object may be marked as doing source filtering.

As soon as an event control block is allocated and declared to the name service through its named object, the corresponding event server may be contacted to update its local configuration. Referring back to FIG. 7, event protocol module 704 may detect an incoming connection on the internal socket of an event control block, such as event control block 701(a) and dispatch the request to event control manager 703. Updating the configuration may proceed as follows. When a connection to event channel 750 is requested on an event control block

701(*a*) socket, event control manager 703 tries to accept the connection. If the connection is established successfully, event control manager 703 builds a new remote event control block object with the socket returned by the accept(2) function call and inserts the object in the remote event control block list of event control block 701(*a*).

Table 2 shows the possible cases and specifies if the connection event control block-event control block is consistent. The first column depicts the possible access permissions of the event control block on which a connection is requested. The first depicts the access permissions of the event control block initiator of the connection with the event channel.

events throughout the network. The function call event_channel_open(3) may take an inconvenient amount of time to finish and the event control block may be more or less locked during the operation. At least the RECB list has to be protected between two successive connections to guarantee its consistency.

When the last publisher closes its reference to an event control block, all network connections with distant subscribers may be kept alive and the event control block may be updated when new subscribers appear in the network. When the last subscriber closes its reference to an event control block, a filtering control message preventing further publica-

|  | ECB initiator has only publishers | ECB initiator has only subscribers | ECB initiator has publishers and subscribers |
| --- | --- | --- | --- |
| requested ECB has only publishers. | Not possible - The ECB initiator will not try to connect(2). | OK - Published events will be routed to the ECB initiator. | OK - Published events will be routed to the ECB initiator. The initiator will not route published events since it knows the remote ECB has only publishers. |
| requested ECB has only subscribers. | OK - ECB initiator will route published events to the remove ECB. | Not possible - The ECB initiator will not try to connect(2). | OK - ECB initiator will route published events to the remote ECB. |
| requested ECB has publishers and subscribers. | BAD - The requested ECB will route published events to the initiator that has only publishers. | OK - The requested ECB will route published events to the initiator. | OK - Both ECBs will route published events to each others. |

The wrong event control block-event control block connection, depicted in the cell marked as BAD, may be considered as a filtering issue rather than a configuration problem. The distributed filtering involves a published event routed to an event control block and not being delivered to any subscribers because of the filtering. A wrong configuration may be similar to a filtering problem, and may be resolved in the same manner.

When the event control manager, such as event control manager 703 in FIG. 7, updates every remote configuration during a function call to event_channel_open(3), the wrong event control block-event control block connection is detected and a filtering control message is sent to the requested event control block to prevent published event from being routed on this connection. In the same way, when an event control block changes its access permission due to a new subscriber, a filtering control message is sent for each RECB object found doing source filtering. The message enables or re-enables published event to be routed to the event channel. Depending on the number of nodes involved during the configuration update, this process may be done in advance or on request. The filtering control message preventing published events from being routed may be sent only when some events are received from the event channel connection.

The process of removing the last subscriber and/or publisher from an event control block may be as follows. On an event channel involving a large number of nodes, the function call event_channel_open(3) may be expensive because a point-to-point connection needs to be established for each publisher/subscriber pair. Thus, the access permission of an event control block is promoted rather than updated. An event channel may have hundreds of nodes involved in exchanging tions on the event control block is sent for each RECB object found as a publisher in the remote event control block list. The same control message may be sent when the event control block is updated dynamically. If the number of nodes involved is large, the control message may be postponed until some events actually are received from the event channel.

When the last reference to an event control block is closed, the event control block object is deallocated by executing the following steps. The event control manager unlinks the corresponding named object in the event channel naming context. Each RECB object is freed, therefore closing all the local asynchronous endpoints used by the event control block. Because the asynchronous messaging uses a connection oriented protocol, every distant event protocol module may detect the end of a connection and free its corresponding local resources. This action may be true when a node goes down or when the event server fails.

Removing an event channel from the naming service involves deleting the event channel naming context from the name server, preferably using the ns_unlink(3) function call. In an embodiment, the function call ns_unlink(3) may not invalidate the iterator in case the naming context changes but, instead, returns an error as a hint for the calling application. This action may avoid declaring a new subscriber and/or publisher to loop until the context is stable, or the consistency of the naming context is guaranteed by the remote event control block list and by the fact that the node may bind its own named object in the directory. In addition, returning an error may simplify the deletion of the naming context by not having to restart the browsing each time one named object is deleted.

FIGS. 9-13 depict a distributed filtering process in accordance with an embodiment of the present invention. As noted above, an event may contain three strings, or pattern fields, that define its name. A subscriber may tune the number of events to receive by filtering incoming events based on the pattern fields. The function call event_bind_subscriber(3) takes an input parameter that defines three pattern fields. The filtering may be done by prefix matching the filter pattern fields with the events' pattern fields. The event is delivered if a match occurs within each filter pattern field with the event pattern field. This operation may be repeated to enable a subscriber to define precisely the type of events to be processed, as disclosed above.

Problems might occur when the subscriber's configuration of the network is modified dynamically for each event published. Therefore, a number of events potentially may be sent over the network without being consumed by any applications. According to an embodiment, the number of unnecessary events may be reduced by performing part of the filtering at the publisher node. This filtering also may speed up the filtering process at the subscriber node.

One implementation of the publisher side filtering may be parsing all filtering assignments linearly each time an event is received. The parsing implementation may have drawbacks, such as an algorithm needing to parse all filtering information to detect that no subscribers are interested in the event. Further, the complexity in time is linear to the number of filtering assignments, or bindings, and may be expressed by the equation O(n). "O" may stand for order of magnitude.

Another implementation uses an algorithm that detects if no subscribers are interested in an event given the event and a set of filtering assignments, or bindings. The event and filtering bindings may be forwarded as a hint to a publisher node in order to reduce the number of unnecessary sent events. The algorithm preferably may be expressed by the equation O(log (n)).

As noted above with regard to FIG. 3, an event may define three pattern fields, or pattern strings. A subscriber node may define and assign three fields, or strings, to the filter. The filtering process comprises comparing each field, or string, to determine a match. A match occurs if filter field 1 is null or a prefix of pattern field 1, filter field 2 is null or a prefix of pattern field 2, and filter field 3 is null or a prefix of pattern field 3.

Even though no semantic is attached to the event patterns from a system point of view, the application may define one. Thus, a relationship may exist between the different patterns of an event and one pattern may be more relevant than other patterns. In addition, if an application is considered a set of publisher and subscriber processes distributed in the network, then it may be probable that on a given node, most of the subscribers of an event channel are interested in the same type of events. Therefore, at the filtering level, one prefix should be greater in importance than others because it defines the root prefix of an event pattern of interest to most of the local subscriber applications.

Thus, on a given node and for one event channel, an optimal tree of filter fields, or strings, exist that reflect the set of subscribers interested in a specific event. The optimal tree may be determined according to the disclosed embodiments. This approach is preferred over the linear approached disclosed above.

Figure 9:
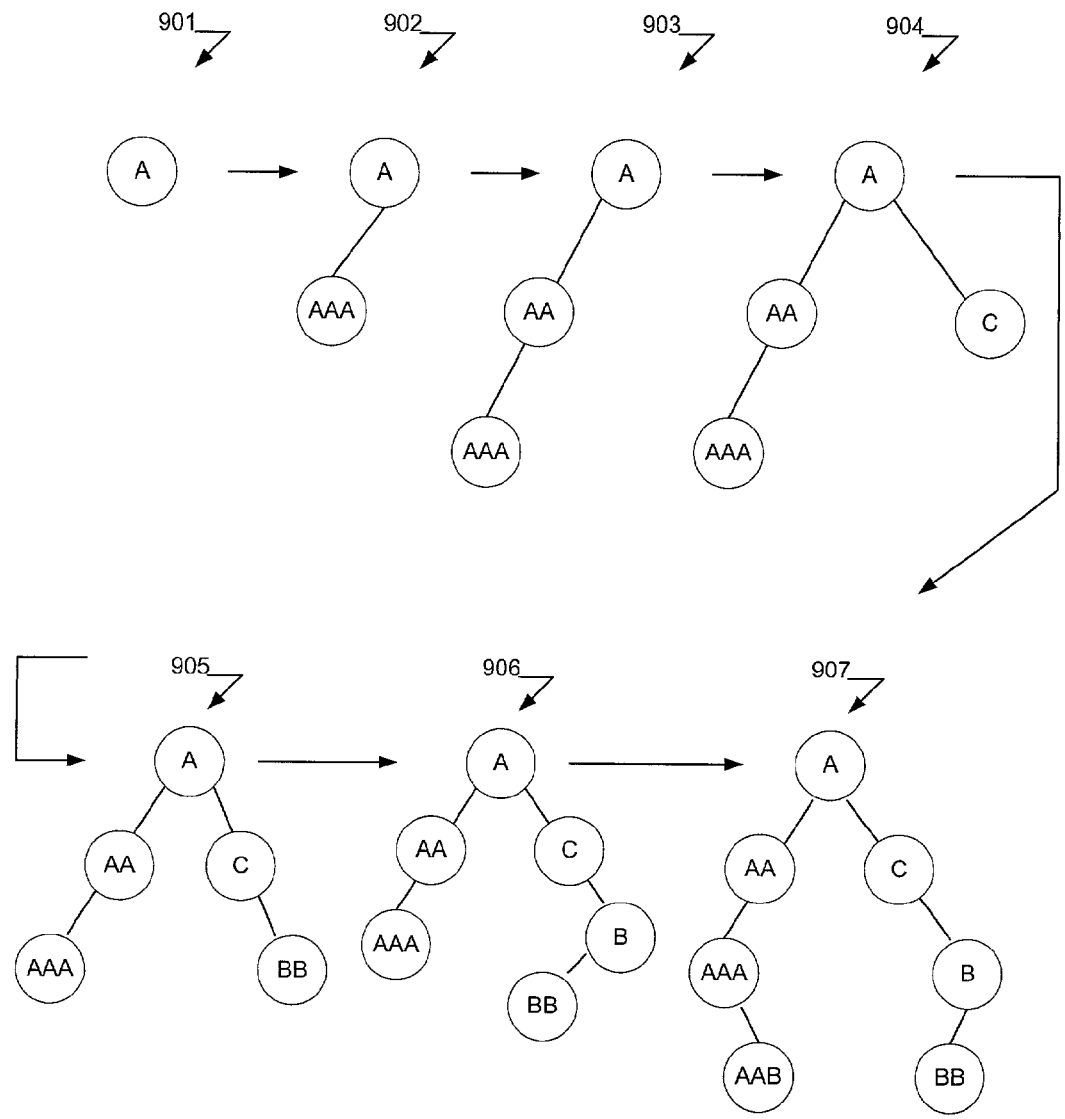
FIG. 9 illustrates a binary tree in accordance with an embodiment of the present invention.

A binary tree may be built using rules. These rules may be analyzed for efficiency and weaknesses to be modified for distributed filtering. Referring to FIG. 9, a binary tree is depicted in accordance with an embodiment of the present invention. A binary tree 907 may be built using a rule. The rule may state let X be a node in the binary tree. If Y is a node in the left subtree of X, then X is a prefix of Y. If Y is a node in the right subtree of X, then X is neither a prefix or suffix of Y. Thus, binary tree 901 inserts A as a node. Binary tree 902 inserts AAA on the left side of A. Binary tree 903 inserts AA between A and AAA on the left side of A. Binary tree 904 inserts C on the right side of A. Binary tree 905 inserts BB on the right side to C. Binary tree 906 inserts B between C and BB, such that BB is on the left side of B. Binary tree 907 inserts AAB on the right side of AAA.

Binary tree 907 may be efficient if most of the filter fields, or strings, are prefixes or suffixes of each other, or the left edges of the tree. Binary tree 907 may not perform well if the prefixes or suffixes are on the right side of the tree. In fact, if no subscribers share the same prefix, binary tree 907 is linear.

Problems may occur if a filter field, or string, does not share any prefix that is put into the tree. A solution may involve building the right edges of the tree in a modified manner, such as using a lexicographical tree. In the final tree, a node may have three children that define three subtrees; left, middle and right. The tree is built to satisfy certain properties. The properties may include having X as a node in the search. One property of the tree may be if Y is a node in the middle subtree of X, then X is a prefix of Y. Another property of the tree may be if Y is a node in the left subtree of X, then X is lexicographically greater than Y. Another property of the tree may be if Y is a node in the right subtree of X, then X is lexicographically less than Y.

Figure 10:
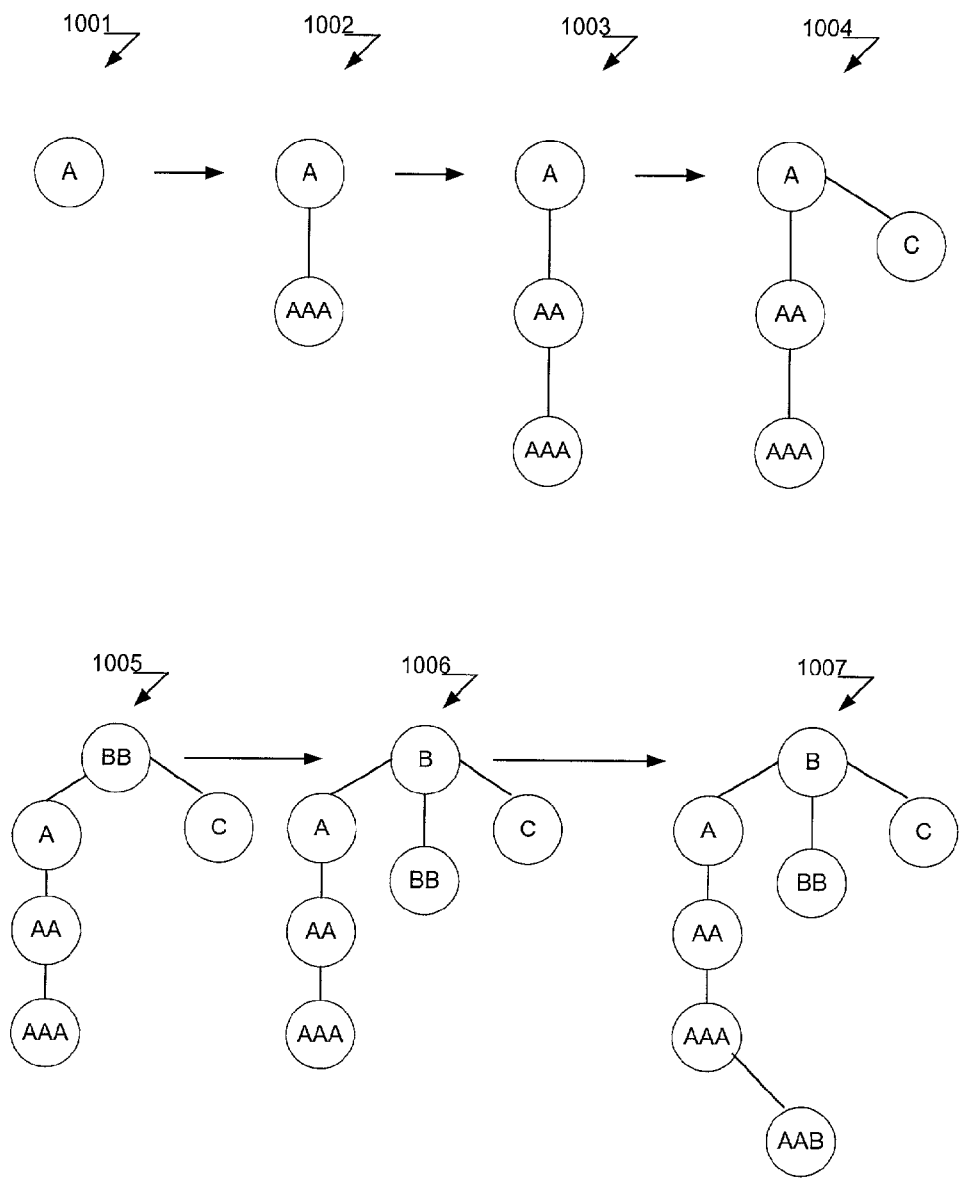
FIG. 10 illustrates a binary tree having an lexicographic order in accordance with an embodiment of the present invention.

FIG. 10 depicts a binary tree having a lexicographic order in accordance with an embodiment of the present invention. Binary tree 1001 inserts A. Binary tree 1002 inserts AAA into a middle subtree of A. Binary tree 1003 inserts AA between A and AAA, as a middle subtree of A, and with AAA as a middle subtree of AA. Binary tree 1004 inserts C in a right subtree of A. Binary tree 1005 inserts B between A and C, such that A becomes a left subtree of B. Binary tree 1006 inserts BB into the middle subtree of B. Binary tree 1007 inserts AAB as a right subtree of AAA. In binary tree 1007, A, B and C would be the set of conditions to deliver an event. Thus, a binary search tree with a lexicographic order is used to reach the root prefix of a set of filter fields, or strings. Starting from a root prefix, the middle subtree may represent the list of filter fields, or strings, that should be checked to process an incoming event. The filter fields may pertain to potential subscribers. Binary tree 1007 may be represented by the equation O(log (n)), which indicates a complexity in time. Binary tree 1007 may represent a set of conditions that is forwarded to a publisher node to reduce the number of unnecessary event sent over the network.

Figure 11:
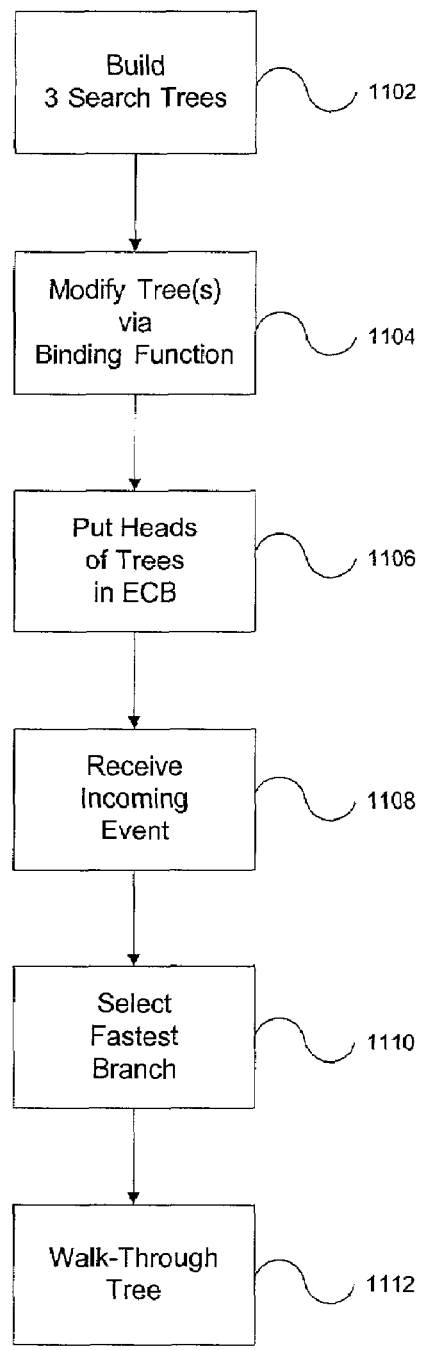
FIG. 11 illustrates a flowchart for implementing distributed filtering in accordance with an embodiment of the present invention.

FIG. 11 depicts a flowchart for implementing distributed filtering in accordance to an embodiment of the present invention. Step 1102 executes by building three search trees. Each search tree may represent a possible filter field, or string; filter field 1, filter field 2 and filter field 3. Step 1104 executes by modifying trees via a binding function, or function calls event_bind_subscriber(3) and event_unbind_subscriber(3). The binding function also may be known as an assigning function, where a filter is assigned to identify events on an event channel.

Step 1106 executes by putting heads of the trees in the event control block correlating to the filter. A node of a filtering assignment, or binding, may contain the filter field, or string, to be compared, such as filter field 1, filter field 2, or filter field 3. The node also may contain the three potential children: left, middle or right. The node also may contain an index that references the event channel descriptor associated with the filtering assignment. The index may be used when walking through the filter tree to mark the incoming event as "to be delivered" on the event channel descriptor. To facilitate this action, a network event service structure may have a bits string with a bit corresponding to a potential event channel descriptor. The node also may contain a parent link used to remove a filtering assignment, or binding, from a search tree. The node also may contain an index in a filter table to access the other nodes of the filtering assignment.

Step 1108 executes by receiving the incoming event. The event control manager within the event server retrieves the corresponding event control block. Step 1110 executes by selecting the fastest branch, or tree, to perform the filtering. The fastest tree may be the tree that has the greatest height in the lexicographical tree. Step 1112 executes by walking through the selected tree using the corresponding event pattern as the compare pattern. The fastest search tree may be the one with the greatest number of nodes in the tree.

Figure 12:
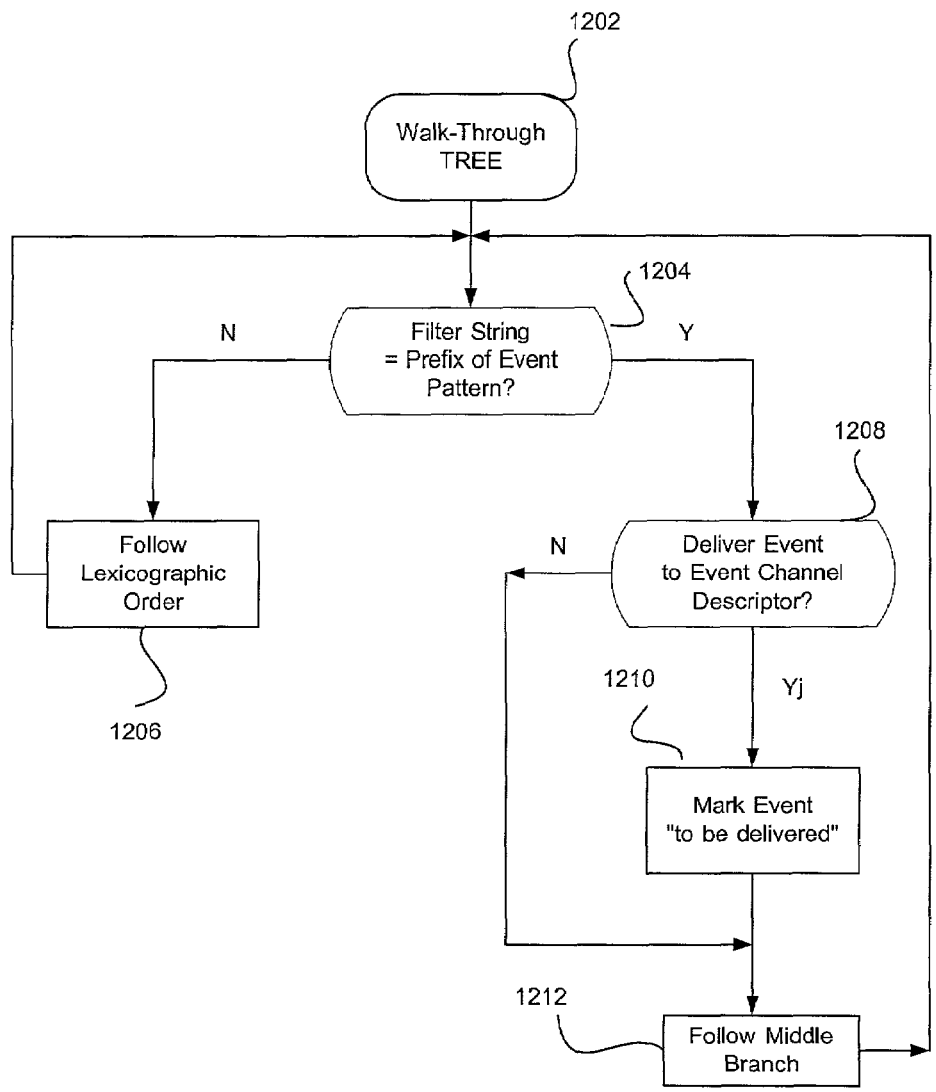
FIG. 12 illustrates a flowchart for walking through a search tree in accordance with an embodiment of the present invention.

FIG. 12 depicts a flowchart for walking through a search tree in accordance with an embodiment of the present invention. Step 1202 executes by indicating the walk through process is initiated. Step 1204 executes by determining whether if the filter field, or string, is a prefix of the event pattern. If no, then step 1206 executes by following the lexicographic order and returning to step 1204. If step 1204 is yes, then step 1208 executes by determining whether the event is to be delivered to an event channel descriptor. If yes, then step 1210 is executed by marking the event as "to be delivered" to the event channel descriptor. The event is marked by setting a bit in the event structure. Step 1212 executes by following the middle branch in the search tree. If step 1208 is no, then step 1212 is executed.

The flowchart may be the same if one of the filter fields provided during a call to event_bind_subscriber(3) contains a null value. A null value is a prefix of everything. The corresponding filtering node may be inserted at the head of the tree.

A subscriber may not provide a filtering assignment, or binding, in cases where all events are to be delivered to the subscriber. One process to integrate these cases in the process disclosed in FIG. 12 is to enact the following procedure. An event control block object records a bits string of the same length as the one in a system event pattern. The bits string marks all event channel descriptors that did not specify a filtering assignment, or binding. When the event protocol module finishes the walk through the search tree, the bits string of the event structure is OR'ed with the bits string of the event control block object before being queued for processing by the application.

Event servers may collaborate with each other to modify the destination nodes of a published event by exchanging special events called filtering control messages. A filtering control message may its type set to FILTERING and may be processed internally by the event network. Several situations may occur where these events are sent. When the percentage of unnecessary events sent through an event control block-event control block connection becomes important, the event server may try to reduce the number of events published by distributing part of the filtering at the publisher node.

Figure 13:
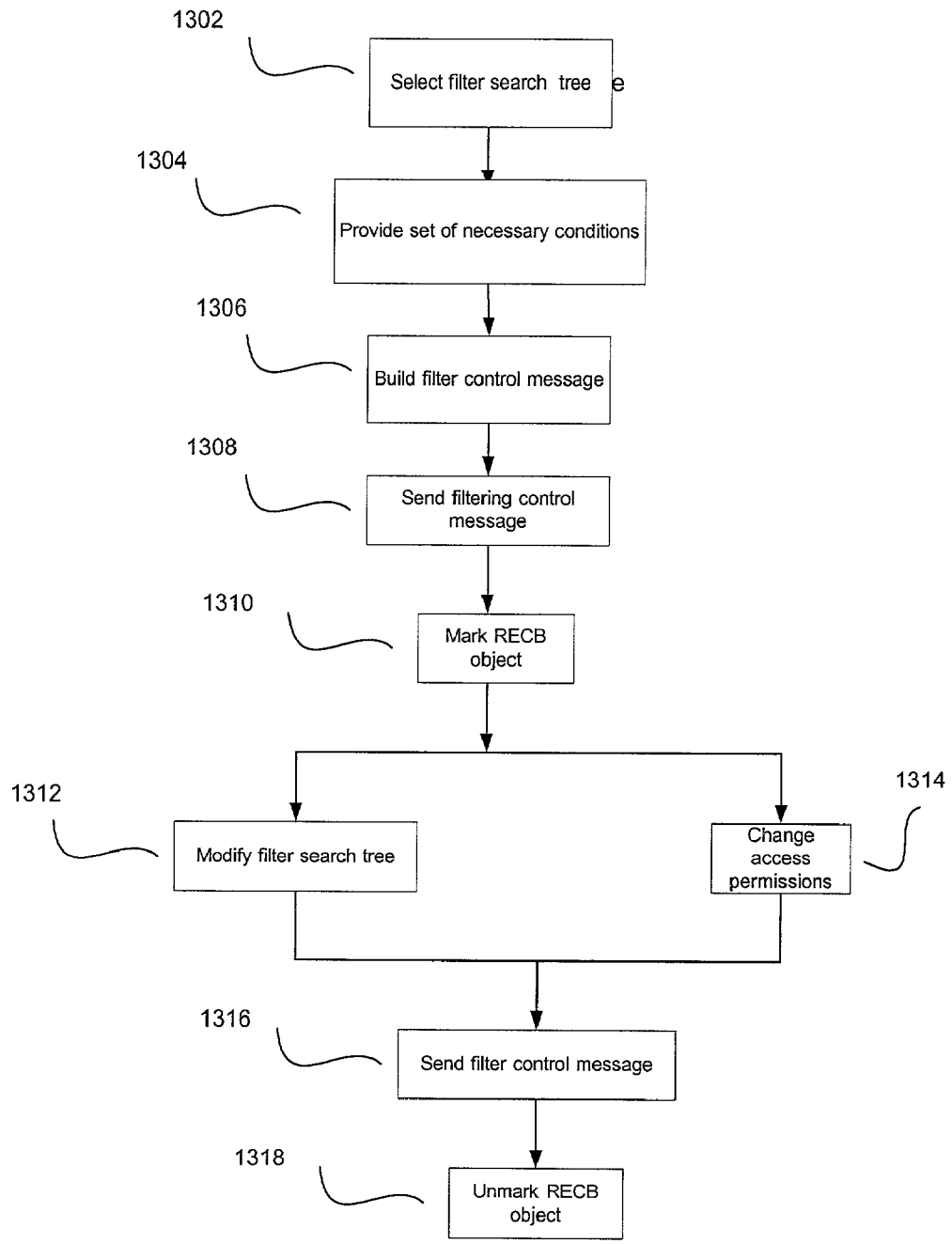
FIG. 13 illustrates a flowchart for source filtering in accordance with an embodiment of the present invention.

FIG. 13 depicts a flowchart for source filtering in accordance with an embodiment of the present invention. Step 1302 executes by selecting an appropriate filter search tree with the event protocol module. The event protocol module computes the set of necessary conditions to process an event locally. An appropriate tree may be the one that has the smallest height in the lexicographic tree and does not start with a null node value. If such a tree exists, step 1304 executes by providing a set of necessary conditions from the first level of nodes locally to process an event. Step 1306 executes by building a filtering control message including the filter fields, or strings, from the first level of nodes in the event data with the event protocol module. Step 1308 executes by sending the filtering control message to the publisher event control block. When the access permissions of an event control block is updated for not having to process incoming events, a filtering control message preventing further publication on the event control block is sent for each remote event control block object found as a publisher. The filtering control message is built with a null value in its data. Step 1310 executes by marking each remote event control block object as doing source filtering.

Steps 1312 and 1316 execute when a filtering control message with no data is sent to each distant event control block marked as doing source filtering when the first level of nodes of a filter search tree is modified, such as during a function call to event_[un]bind_subscriber(3). Steps 1314 and 1316 execute when the filtering control message also is sent because the access permissions of an event control block have changed, such as during a function call to event_channel_open(3). The filtering control message re-enables the publication of all events for the event channel. The message should guarantee that a subscriber does not lose any events. A node changing its configuration should determine that the modification is taken into account by all publisher nodes. When the message is acknowledged, step 1318 executes by having the corresponding remote event control block object unmarked as doing source filtering.

It will be appreciated by those skilled in the art that the present invention can be embodied in other specific forms without departing from the spirit or essential characteristics thereof. The presently disclosed embodiments are considered in all respects to be illustrative and not restricted. The scope of the invention is indicated by the appended claims rather than the foregoing Description and all changes that come within the meaning and range and equivalence thereof are intended to be embraced therein.

APPENDIX A

3 FUNCTION CALLS
    3.1 ces_channel_open
        NAME
            ces_channel_open , ces_channel_close , ces_channel_unlink - open, close and unlink an event channel
        SYNOPSYS
    #include <ces.h>
    #include <cns.h>
    ces_channel_t ces_channel_open(cns_context_t* ctx, char* name, int
            oflag, mode_t mode, ces_channel_param_t*
            open_param);
    int    ces_channel_close(ces_channel_t chid);
    int    ces_channel_unlink(const char* name);

Arguments ctx is a naming context used to register the event channel in the cluster name service.

name is an application string used to identify the channel.

oflag specifies the requested access modes.

mode specifies the permission to use if the channel has to be created.

open_param is a channel specific structure which defines additional parameters.

chid is an event channel handle previously returned by ces_channel_open.

Description ces_channel_open opens/creates a channel and returns a new handle to access it. An event channel can be seen as an object that allows multiple suppliers to communicate with multiple consumers asynchronously. An event channel provides the following properties:

reliability: an event is delivered to all existing subscribers that are part of the cluster. If a subscriber dies (application or nodes) before the event is delivered, the event is lost. If a publisher node dies, in the middle of the publish operation, no atomicity is guaranteed (some subscribers can get the event while others don't).

flow control: flow control is managed on a per channel basis. Applications can use separate channels to communicate.

ordering: events sent by a given publisher on a particular channel will be received by subscribers on this channel in the same order that have been published.

event atomicity: only "complete" events are published and only "complete" events are delivered to subscribers.

The couple ctx/name is used to identify globally an event channel in the cluster. Event channels are registered in the cluster name service as a non persistent binding using theses parameters (see the manual page cns_bind(3) for more details).

The parameter oflag is the bitwise inclusive OR of values from the following list. Applications must specify exactly one of the first three values (access mode) below the value of oflag.

O_RDONLY: Open the channel for subscribing to events. The process can use the returned channel handle with ces_bind_subscriber but not with ces_publish.

O_WRONLY: Open the channel for publishing events. The process can use the returned channel handle with ces_publish but not with ces_bind_subscriber.

O_RDWR: Open the channel for both publishing and subscribing to events. The process can use any functions allowed for O_RDONLY and O_WRONLY.

Any combination of the remaining flags may additionally be specified in the value oflag:

O_CREAT: This option is used to create an event channel, and it requires one additional argument: mode, which is of the type mode_t. If the parameter name, has already been used to create an event channel that still exists, then this flag has no effect, except as noted under O_EXCL (see below). Otherwise, an event channel is created without any events in it. The owner ID of the event channel is set to the user ID of the process, and the group ID of the event channel is set to the group ID of the process.

O_EXCL: If both O_EXCL and O_CREAT are set, ces_channel_open will fail if the event channel specified by name exists. The check for the existence of the event channel and its creation, if it does not exist, are atomic with respect to other processes executing ces_channel_open.

The parameter open_param has the following type:

```
type def struct {
    char*              app_name;
    ces_callback_t     deliver_event;
} ces_channel_param_t;
```

The supplied app_name parameter is a sized limited string used by the events framework to identify the application that opened the event channel. The maximum length of this string is defined by the constant CES_APPNAME_MAX. See ces_event_allocate(3) manual page for more details about the use of the app_name field.

The supplied deliver_event function should be prototyped as:

int callback(ces_event_t ev, void* cookie, void* data, size_t len);

An application that wants to subscribe on the channel has to provide a deliver event function. This function is called when an event, which matches the subscriber binding is received. No events are delivered to the application until a filtering binding is specified. See the ces_bind_subscriber(3) manual page for more detail.

An event channel can be open multiple times in the same or different processes for publishing and subscribing to events. If an application opens an event channel multiple time, it is possible to receive the same event multiple times. However, it will never be received more than once on a particular event channel handle.

ces_channel_close closes/frees a previously allocated event channel handle. Further references to this handle will return an error. If the event channel is no more referenced by any applications, it is implicitly deleted from the names space.

ces_channel_unlink removes explicitly an event channel name from the names space but the event channel itself continues to exist as long as some subscribers or publishers are using it. If an another event channel is created using the same name, a new event channel is initialized. In other words, the previous event channel still exists but it is no longer accessible.

Return Values ces_channel_open returns a handle for the event channel or −1 in case of error. Upon success, ces_channel_close and ces_channel_unlink return 0, otherwise −1 is returned.

On errors, the variable errno is set accordingly.

ERRORS

| | |
|---|---|
| [EACCESS] | the event channel exists and the permissions specified by oflag are denied, or the event channel does not exist and permissions to create the event channel is denied. |
| [EEXIST] | O_CREAT and O_EXCL are set and the event channel already exists. |
| [ENOENT] | O_CREAT is not set and the event channel does not exist. |
| [EINVAL] | chid is an invalid event channel descriptor, or the access modes specified by oflag are incompatible, or the provided naming context ctx is invalid, or the couple ctx/name exists in the name service but does not correspond to an event channel. |
| [ENAMETOOLONG] | the length of app_name exceeds the maximum size defined by the constant CES_APPNAME_MAX or the length of name exceeds the limit defined by the name |

-continued

| | |
|---|---|
| [ENOSPC] | service.<br>the function call fails due to a lack of resources. |
| [EFAULT] | some of the provided data are outside the process's address space. |

3.2 ces_bind_subscriber

Name ces_bind_subscriber, ces_unbind_subscriber—bind or unbind a subscriber from an event channel

---

SYNOPSYS
include <ces.h>
ces_bind_t ces_bind_subscriber(ces_channel_t chid, ces_bind_param_t*
                               bind_param, void* cookie);
int        ces_unbind_subscriber(ces_bind_t bind_id);
    ARGUMENTS
        • chid: handle previously returned by
          ces_channel_open.
        • bind param is a structure that defines the
          parameters to bind to the channel.
        • cookie is an application argument to be passed back
          to the event delivery callback.
        • bind_id is a binding identifier previously returned by
          ces_bind_subscriber.

---

Description

Applications that want to subscribe for specific events have to register to an event channel by calling ces_bind_subscriber. The application function deliver_event specified at open time is called when an event that matches the subscriber binding is received.

---

The parameter bind_param has the following type:

```
typedef struct {
    char* filter1;
    char* filter2;
    char* filter3;
} ces_bind_param_t;
```

---

An event defines three attributes pattern1, pattern2, pattern3 (see the ces_event_allocate(3) manual page).

The filtering is done by prefix matching the filter strings with the event patterns. A match occurs if each filter is a prefix of the corresponding pattern (filter1/pattern1 and filter2/pattern2, and filter3/pattern3).

Each filter string has a maximum size defined by the constant CES_PATTERN_MAX. In case an event matches several bind subscriptions on a given channel, the system will pick the first match (implementation dependent) and only invoke the callback function once.

If a channel is opened twice by the same process, and a given event is matched on both open channels, two callbacks will be performed (one for each opened channel).

If an application wishes to stop receiving some of the events previously registered, it may call ces_unbind_subscriber to unbind for those events.

Note that the event service also publishes specific events (see section Flow control and events in this document). These events bypass the filtering mechanism and are in cases delivered to the application.

Return Values ces_bind_subscriber returns a binding identifier or −1 in case of error. Upon successful completion, ces_unbind_subscriber returns 0. Otherwise, −1 is returned.

On errors, the variable errno is set to indicate the reason of failure.

---

| | |
|---|---|
| ERRORS | |
| [ENOMEM] | the system is unable to allocate all resources to bind the subscriber. |
| [EINVAL] | chid is an invalid event channel descriptor or bind_id is an invalid filter identifier. |
| [ENAMETOOLONG] | the length of one of the provided filter string exceeds the maximum size defined by the constant CES_PATTERN_MAX. |
| [EFAULT] | some of the provided data are outside the process's address space. |

3.3 ces_event_allocate

Name ces_event_allocate, ces_event_free—allocate or free an event.

Synopsys
include <ces.h>
ces_event_t ces_event_allocate( );
void ces_event_free(ces_event_t ev);

Arguments ev: event returned by a previous call to ces_event_allocate.

Description ces_event_allocate allocates memory for the event instance and initializes all internal attributes to a default value. An event defines the following attributes:

| NAME | TYPE | DEFAULT | ACCESS |
|---|---|---|---|
| EVATTR_PATTERN1 | char[CES_PATTERN_MAX] | Empty string | read-write |
| EVATTR_PATTERN2 | char[CES_PATTERN_MAX] | Empty string | read-write |
| EVATTR_PATTERN3 | char[CES_PATTERN_MAX] | Empty string | read-write |
| EVATTR_UNIQUE_ID | ces_id_t | Invalid identifier | read-only |

-continued

| NAME | TYPE | DEFAULT | ACCESS |
|---|---|---|---|
| EVATTR_PUBLISH_DATE | struct timeval | Invalid timeval | read-only |
| EVATTR_PUBLISH_ID | char[CES_APPNAME_MAX] | Empty string | read-only |
| EVATTR_PUBLISH_NODE | node_id_t | Invalid identifier | read-only |

EVATTR_PATTERN1
EVATTR_PATTERN2
EVATTR_PATTERN3
 Theses attributes are NULL terminated string and define the name of event. The maximum size of a pattern is defined by the constant CES_PATTERN_MAX. These attributes are initialized to an empty string at allocation time.
EVATTR_UNIQUE_ID
 This attribute is a per channel unique identifier assigned by the system at publication time (during a ces_publish(3) operation). This attribute is read-only and initialized to an invalid value at allocation time.
EVATTR_PUBLISH_DATE
 This attribute is a time stamp automatically set by the system at publication time. This field is read-only and initialized to a invalid value at allocation time.
EVATTR_PUBLISH_ID
 This attribute contains a copy of the field app_name from the ces_channel_param_t structure specified during ces_channel-open(3). This attribute is read-only and set automatically by the system at publication time. This field is initialized to an empty string by ces_event_allocate(3).
EVATTIR_PUBLISH_NODE
 This read-only attribute is set automatically by the system at publication time to contain the node identifier of the publisher. This field is initialized to an invalid value by ces_event_allocate(3).
 ces_event_free deallocates memory associated with an event.
 Return Values
 ces_event_allocate returns the allocated event on success. NULL is returned on failure and errno is set accordingly.
 ces_event_free does not return a value.

| ERRORS | |
|---|---|
| [ENOMEM] | the system is out of resources. |

3.4 ces_set_pattern1, ces_get_pattern1
 Name
 ces_set_pattern1, ces_get_pattern1
 ces_set_pattern2, ces_get_pattern2
 ces_set_pattern3, ces_get_pattern3
 ces_get_uniqueId
 ces_get_publishDate
 ces_get_publishId
 ces_get_publishNode SYNOPSYS
include <ces.h>
int     ces_set_pattern1(ces_event_t ev, char* pattern);
int     ces_get_pattern1(ces_event_t ev, char* pattern);

-continued int     ces_set_pattern2(ces_event_t ev, char* pattern);
int     ces_get_pattern2(ces_event_t ev, char* pattern);
int     ces_set_pattern3(ces_event_t ev, char* pattern);
int     ces_get_pattern3(ces_event_t ev, char* pattern);
int     ces_get_uniqueId(ces_event_t ev, ces_id_t* eventid);
int     ces_get_publishDate(ces_event_t ev, struct timeval* tv);
int     ces_get_publishId(ces_event_t ev, char* procId);
int     ces_get_publishNode(ces_event_t ev, node_id_t* nodeid);

Arguments
ev is an event previously returned by ces_event_allocate.
pattern is a size limited string. The maximum size is defined by the constant CES_PATTERN_MAX.
tv is a timeval structure as specified in /usr/include/sys/time.h.
eventid is an unique event identifier.
nodeid is a node identifier as specified by the cluster framework.
procId is a size limited string. The maximum size is defined by the constant CES_APPNAME_MAX.
Description
ces_set_pattern1(3)
ces_set_pattern2(3)
ces_set_pattern3(3)
 Theses functions set respectively the attribute EVATTR_ ATTERN1, EVATTR_PATTERN2 and EVATTR_ PATTERN3 of the provided event.
ces_get_pattern1(3)
ces_get_pattern2(3)
ces_get_pattern3(3)
 These functions get respectively the current value of the attribute EVATTR_PATTERN1, EVATTR_PATTERN2 and EVATTR_PATTERN3 of the provided event. Note that it is the caller's responsibility to provide the string buffer in which the current value is copied.
ces_get_uniqueId(3)
 This function returns in eventid the unique identifier for this event.
ces get_publishDate(3)
 This function returns in the structure tv the date of the publish operation.
ces_get_publishId(3)
 This function returns a copy of the attribute EVATTR_PUBLISH_ID in procId. Note that it is the caller's responsibility to provide the string buffer in which the current value is copied.
ces_get_publishNode(3)
 This function returns in nodeid the publisher node for this event.
Return Values
Upon successful completion, the above functions return 0. Otherwise, −1 is returned and errno is set to indicate the reason of failure.

| ERRORS | |
|---|---|
| [ENAMETOOLONG] | the provided argument exceeds the maximum size of −1 attribute. |
| [ENOMEM] | The system is out of resources. |

3.5 ces_publish
 Name ces_publish—publish an event on a channel.
Synopsys
include <ces.h>
int ces_publish(ces_channel_t chid, ces_event_t ev, const void* data, size_t len);
Arguments
chid is a channel handle previously returned by ces_channel_open.
ev is an event previously returned by ces_event_allocate.
data is a buffer to be sent with the event.
len specified the size of the buffer data.
Description
ces_publish posts an event on the given channel.
It is possible to specify some data with the event by using the data and len_parameters. The storage associated with the ev/data arguments are the responsibility of the caller.
The maximum size of the data buffer which can be sent with an event is defined by the constant CES_DATA_MAX.
Return Values
Upon successful completion, 0 is returned. Otherwise, −1 is returned and errno is set to indicate the reason of failure.

| ERRORS | |
|---|---|
| [EINVAL] | chid is an invalid event channel descriptor or the length of the buffer data exceeds CES_DATA_MAX. |
| [EFAULT] | some of the provided data are outside the process's address space. |
| [EAGAIN] | the requested operation failed due to a flow control problem; the event cannot be delivered to all subscriber nodes. |

3.6 ces_channel_fileno, ces_dispatch
Name
ces_channel_fileno, ces_dispatch—process incoming events
Synopsys
include <ces.h>
int ces_channel_fileno(ces_channel_t chid);
int ces_dispatch(ces_channel_t chid, ces_event_t, void* data, size_t len);
Arguments
chid is a channel handle previously returned by ces_channel_open.
ev is an event previously returned by ces_event_allocate.
data is a buffer used to process the incoming event's data.
len specifies the size of the buffer data.
Description
Subscribers have to use these interfaces in order to process incoming events.
ces_channel_fileno returns a file descriptor on which applications can do "select" to detect incoming events. The system guarantees that "select" returns TRUE as long as there are some events that need to be processed. This file descriptor should only be used with the select(2) or poll(2) system calls. Using it differently will cause undefined results.
ces_dispatch fetches the first pending event on the given channel and dispatches it by modifying the supplied arguments ev, data and size with the corresponding values from the incoming event and by calling the appropriate subscriber callback passing the modified ev, data and size as input arguments. In case ces_dispatch returns an error, the pending event is not processed and the subscriber callback is not invoked.

Return Values
Upon success, ces_channel_fileno returns a integer file descriptor associated with the channel handle chid. Otherwise, −1 is returned and errno is set to indicate the reason of failure.
ces_dispatch returns a positive value if there are still some pending events to process on the given event channel, otherwise 0 is returned. Note that these return values should be considered as hints in case of multi-threaded applications. In case of error, −1 is returned and errno is set to indicate the reason of failure.

| ERRORS | |
|---|---|
| [EINVAL] | chid is a valid event channel descriptor or the event channel has been opened for publishing only. |
| [EFAULT] | some of the provided data are outside the process's address space. |
| [EOVERFLOW] | the size of the incoming event's data buffer exceeds the size of the provided data buffer. |
| [ENOMEM] | the system is out of resources. |

What is claimed is:

1. A network having a plurality of nodes connected by a digital data communication link, comprising:
   an event channel adapted to transfer an event between a publisher node and a subscriber node within said network over the communication link;
   a filter on said subscriber node to process a plurality of events published on said event channel to identify said event as a matching event, wherein said matching event includes at least one pattern field that matches a filter field within said filter; and
   an application on said subscriber node to receive said matching event, wherein said application defines said filter and said filter field and opens said event channel at said subscriber node.

2. The network of claim 1, further comprising an event server on said subscriber node, said event server adapted to receive said event and to pass said received event to said filter from said event channel.

3. The network of claim 2, wherein said event server exchanges information with another event server on another one of the nodes of the network.

4. The network of claim 2, wherein said application opens said event channel through said event server.

5. The network of claim 2, wherein said publisher node has a configuration, said configuration being known to said event server on said subscriber node.

6. The network of claim 1, wherein said event further includes a data field.

7. The network of claim 1, wherein said event channel has a unique name.

8. The network of claim 7, wherein said unique name is registered in a naming service within said network.

9. The network of claim 1, further comprising an event server on said publisher node, wherein said event server publishes said event on said event channel.

10. The network of claim 9, wherein said subscriber node has a configuration, said configuration being known to said event server on said publisher node.

11. The network of claim 1, further comprising a plurality of additional publishers nodes linked to the event channel transferring publishing events on the event channel and a plurality of additional subscriber nodes linked to the event channel, each of the additional subscriber nodes comprising a filter defined by an application on the additional subscriber node with filter fields for use in processing said published events to identify matching events based on the filter fields.

12. A node within a network to exchange information, comprising:
- an application running on the node;
- an event server adapted to receive events from an event channel on a communication link, wherein said event server includes an event control block to subscribe to said event channel for said application; and
- a filter to identify matching ones of said events for use by said application, wherein said filter is assigned by said application, said event includes at least one pattern field, said at least one pattern field matches at least one filter field within said filter, and said event is placed in a queue on said node by said event server prior to the use by said application.

13. The node of claim 12, wherein said event server further includes an event control manager to control said event control block.

14. The node of claim 13, wherein said event control manager updates said event control block.

15. The node of claim 13, wherein said event control manager detects an overload condition within said event control block.

16. The node of claim 13, wherein said event control manager controls a configuration of said event control block.

17. The node of claim 12, wherein said event server further includes an event protocol module to manage network connections to said event control block.

18. The node of claim 12, wherein said event control block includes a remote event control block that correlates to an event control block.

19. The node of claim 12, wherein said event server includes an event channel descriptor to access said event control block for said client application.

20. The node of claim 12, further comprising an event application program interface to publish and subscribe to said event channel.

21. The node of claim 12, wherein said event is processed by said application.

22. A method for receiving information at a node, comprising:
- opening an event channel at said node, said event channel providing a shared communication path on a digital data communication link with other nodes;
- subscribing to receive events at the node over the event channel;
- with an application running on the node, assigning a filter to said event channel by said application;
- receiving an event on said event channel;
- processing said event at said node by said filter to determine whether the received event is a match according to said filter; and
- when determined a match, passing the received event to the application on the node.

23. The method of claim 22, further comprising registering a function indicating said opened event channel.

24. The method of claim 22, further comprising publishing said event on said event channel.

25. The method of claim 22, further comprising dispatching a callback responding to said event.

26. The method of claim 22, further comprising creating said event channel by operation of an event server running on the node.

27. The method of claim 22, further comprising filtering said event by said filter.

28. The method of claim 27, wherein said filtering includes matching a pattern within said event with a filter pattern within said filter.

29. The method of claim 22, further comprising storing said event at an event control block.

30. The method of claim 22, wherein said subscribing includes invoking an event control block.

31. A method for receiving information at a node, comprising:
- opening an event channel with a client application running on said node, the client application opening said event channel in a write mode or a read mode, wherein the client application can publish events over the event channel in said write mode and can receive events published on the event channel in said read mode;
- receiving an event from said event channel at said node;
- assigning a filter to said event channel by said client application running on said node;
- filtering said event from said event channel with said filter at said node by determine whether the received event is a match according to said filter; and
- when determined a match, passing the received event to the client application on the node.

32. The method of claim 31, further comprising queuing said event in an event control block at said node corresponding to said application.

33. The method of claim 31, further comprising dropping said event during an overload condition at said node.

* * * * *